United States Patent
Li et al.

(10) Patent No.: US 10,848,788 B2
(45) Date of Patent: Nov. 24, 2020

(54) MULTI-TYPE-TREE FRAMEWORK FOR VIDEO CODING

(71) Applicant: QUALCOMM Incorporated, San Diego, CA (US)

(72) Inventors: Xiang Li, San Diego, CA (US); Xin Zhao, San Diego, CA (US); Li Zhang, San Diego, CA (US); Jianle Chen, San Diego, CA (US); Hsiao-Chiang Chuang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/862,203

(22) Filed: Jan. 4, 2018

(65) Prior Publication Data
US 2018/0199072 A1    Jul. 12, 2018

Related U.S. Application Data

(60) Provisional application No. 62/443,569, filed on Jan. 6, 2017.

(51) Int. Cl.
*H04N 19/96* (2014.01)
*H04N 19/176* (2014.01)
(Continued)

(52) U.S. Cl.
CPC .......... *H04N 19/96* (2014.11); *H04N 19/105* (2014.11); *H04N 19/122* (2014.11);
(Continued)

(58) Field of Classification Search
CPC .. H04N 19/105; H04N 19/122; H04N 19/124; H04N 19/126; H04N 19/13;
(Continued)

(56) References Cited

U.S. PATENT DOCUMENTS

| | | | |
|---|---|---|---|
| 2010/0208827 A1 | 8/2010 | Divorra Escoda et al. | |
| 2011/0042127 A1 | 2/2011 | Ohtsuka et al. | |

(Continued)

FOREIGN PATENT DOCUMENTS

| | | |
|---|---|---|
| CO | 6331398 A2 | 10/2011 |
| EP | 2547107 A2 | 1/2013 |

(Continued)

OTHER PUBLICATIONS

Budagavi et al. "Core Transform Design in the High Efficiency Video Coding (HEVC) Standard," IEEE Journal of Selected Topics in Signal Processing, vol. 7, No. 6, Dec. 1, 2013, pp. 1029-1041, XP055200337, ISSN: 1932-4553 (Year: 2013).*

(Continued)

*Primary Examiner* — Sath V Perungavoor
*Assistant Examiner* — Tyler B Edwards
(74) *Attorney, Agent, or Firm* — Shumaker & Sieffert, P.A.

(57) ABSTRACT

A method of decoding video comprising: receiving an encoded block of video data, determining a transform for the encoded block of video data, wherein the transform has a size S that is not a power of two, rounding S to a power of two creating a transform with a modified size S', applying an inverse transform with the modified size S' to the encoded block of video data to create residual video data, and decoding the residual video data to create decoded block of video data.

38 Claims, 13 Drawing Sheets

(51) Int. Cl.

| | | |
|---|---|---|
| *H04N 19/61* | (2014.01) | |
| *H04N 19/18* | (2014.01) | |
| *H04N 19/124* | (2014.01) | |
| *H04N 19/105* | (2014.01) | |
| *H04N 19/13* | (2014.01) | |
| *H04N 19/159* | (2014.01) | |
| *H04N 19/186* | (2014.01) | |
| *H04N 19/126* | (2014.01) | |
| *H04N 19/122* | (2014.01) | |
| *H04N 19/42* | (2014.01) | |
| *H04N 19/70* | (2014.01) | |

(52) U.S. Cl.
CPC ......... *H04N 19/124* (2014.11); *H04N 19/126* (2014.11); *H04N 19/13* (2014.11); *H04N 19/159* (2014.11); *H04N 19/176* (2014.11); *H04N 19/18* (2014.11); *H04N 19/186* (2014.11); *H04N 19/42* (2014.11); *H04N 19/61* (2014.11); *H04N 19/70* (2014.11)

(58) Field of Classification Search
CPC .... H04N 19/159; H04N 19/176; H04N 19/18; H04N 19/42; H04N 19/61; H04N 19/70; H04N 19/96
See application file for complete search history.

(56) References Cited

U.S. PATENT DOCUMENTS

| | | |
|---|---|---|
| 2011/0170610 A1 | 7/2011 | Min et al. |
| 2012/0170648 A1 | 7/2012 | Chen et al. |
| 2012/0177120 A1 | 7/2012 | Guo et al. |
| 2012/0189056 A1 | 7/2012 | Li et al. |
| 2012/0213278 A1 | 8/2012 | Yasugi et al. |
| 2012/0328012 A1 | 12/2012 | Sasai et al. |
| 2013/0128974 A1 | 5/2013 | Chien et al. |
| 2014/0192876 A1 | 7/2014 | Yie et al. |
| 2016/0100190 A1 | 4/2016 | Zhang et al. |
| 2016/0277739 A1 | 9/2016 | Puri et al. |
| 2017/0150176 A1 | 5/2017 | Zhang et al. |
| 2017/0150183 A1 | 5/2017 | Zhang et al. |
| 2017/0155903 A1 | 6/2017 | Roswarne et al. |
| 2017/0208336 A1 | 7/2017 | Li et al. |
| 2017/0272782 A1 | 9/2017 | Xiang et al. |

FOREIGN PATENT DOCUMENTS

| | | |
|---|---|---|
| EP | 2804383 A1 | 11/2014 |
| WO | 2011087297 A2 | 7/2011 |
| WO | 2011128269 A1 | 10/2011 |
| WO | 2014120369 A1 | 8/2014 |
| WO | 2016083729 A2 | 6/2016 |
| WO | 2016091161 A1 | 6/2016 |
| WO | 2016155641 A1 | 10/2016 |

OTHER PUBLICATIONS

Leannec et al. "Asymmetric Coding Units in QTBT," 4. JVET Meeting; Oct. 15, 2016-Oct. 21, 2016; Chengdu; URL: http://phenix.int-evry.fr/jvet/, Oct. 10, 2016, pp. 1-10, XP055417365, Chengdu, CN (Year: 2016).*

Russ et al. "Introduction to Image Processing and Analysis," Oct. 31, 2007 (Oct. 31, 2007), CRC Press, Boca Raton, FL, USA, XP055462417, ISBN: 978-0-8493-7073-1, pp. 133-142 (Year: 2007).*

Chen J., et al., Algorithm Description of Joint Exploration Test Model 2, Joint Video Exploration Team (JVET) of ITU-T SG 16 WP 3 and ISO/IEC JTC 1/SC 29/WG 11, 2nd Meeting: San Diego, CA, Feb. 20-26, 2016, JVET-B1001-v3, 32 pp.

Davies T., et al., "Suggestion for a Test Model," 1. JCT-VC Meeting, Apr. 15, 2010-Apr. 23, 2010, Dresden, DE (Joint Collaborative Team on Video Coding of ISO/IEC JTCI/SC29/WGII and ITU-TSG.16), XP030007526, pp. 1-30, May 7, 2010 (May 7, 2010).

Han W-J., et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

Huang H., et al., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-C0024, 5 pp.

Huang H., et al., "EE2.1: Quadtree plus binary tree structure integration with JEM tools," Joint Video Exploration Team (JVET) of ITU-T SG16 WP3 and ISO/IEC JTC1/SC29/WG11 3rd Meeting: Geneva, CH, May 26-Jun. 1, 2016, JVET-:C0024_r1, 5 pp.

Karczewicz et al., "Study of coding efficiency improvements beyond HEVC," 113. MPEG Meeting; Oct. 19, 2015-Oct. 23, 2015; Geneva, CH (Motion Picture Expert Group or ISO/IEC JTC1/SC29/WG11), No. M37102, Oct. 15, 2015 (Oct. 15, 2015), XP030065470, whole document, 13 pp.

Li et al., "Multi-Type-Tree," Joint Collaborative Exploration Team (JVET) of ITU-T SG 16 WP 3 and ISO/IEC JTC1/SC29/WG11, 4th Meeting: Chengdu, CN, Oct. 15-21, 2016, JVET-D0117r1, 3 pp.

Marpe D., et al., "Transform Coding Using the Residual Quadtree (RQT)," Fraunhofer Heinrich Hertz Institute, 4 pp.; URL: http://www.hhi.fraunhofer.de/fields-of-competence/image-processing/researchgroups/ image-video-coding/hevc-high-efficiency-video-coding/transform-coding-using-the-residual-quadtree-rqt.html ; [Retrieved on Feb. 9, 2017].

Mediatek Inc: "Block partitioning structure for next generation video coding," ITU-T SG16 Meeting, Oct. 12, 2015-Oct. 23, 2015, Geneva, CH, No. T13-SG16-C-0966, Sep. 28, 2015 (Sep. 28, 2015), XP030100738, 8 pp.

Minezawa A., et al., "Proposed fix on cbf flag signaling," 98, MPEG Meeting, Nov. 28, 2011-Dec. 2, 2011, Geneva, CH (Motion Picture Expert Group or ISO/IEC JTC1/SC29/WG11), No. M22008, Nov. 28, 2011 (Nov. 28, 2011), JCTVC-G0444-r1, pp. 1-5, XP030050571.

Song B.C., et al., "A new proposal on motion estimation with the OBMC on/off mode for the advanced mode," 39. MPEG Meeting; Apr. 7, 1997-Apr. 11, 1997; Bristol; (Motion Pictureexpert Group or ISO/IEC JTC1/SC29/WG11),, No. M2057, Mar. 30, 1997 (Mar. 30, 1997), XP030031345, ISSN: 0000-0323, 10 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

An J., et al., "Block partitioning structure for next generation video coding," MPEG doc. m37524 and ITU-T SG16 Doc. COM16-C966-E, Oct. 2015, pp. 1-7.

Leannec et al., "Asymmetric Coding Units in QTBT," Joint Video Exploration Team (JVET) of ITU-T SG 16 WP 3 and ISO/IEC JTC 1/SC 29/WG 11; 4th Meeting, Chengdu, CN; Oct. 15-21, 2016, No. JVET-D0064, Oct. 10, 2018, 10 pp.

Budagavi M., et al., "Core Transform Design in the High Efficiency Video Coding (HEVC) Standard," IEEE Journal of Selected Topics in Signal Processing, Dec. 2013, vol. 7 (6), pp. 1029-1041.

Flynn D. et aL, "Overview of the Range Extensions for the HEVC Standard: Tools, Profiles, and Performance", IEEE Transactions on Circuits and Systems for Video Technology, Institute of Electrical and Electronics Engineers, USA, vol. 26, No. 1, Jan. 1, 2016 (Jan. 1, 2016), XP011592176, pp. 4-19, ISSN: 1051-8215, DOI: 10.1109/TCSVT.2015.2478707 [retrieved on Jan. 5, 2016] pp. 11-13, Paragraph V.D.

International Search Report and Written Opinion—PCT/US2018/012589—ISA/EPO—dated Apr. 10, 2018, 15 pp.

Russ J.C., et al., "Introduction to Image Processing and Analysis" In: "Introduction to Image Processing and Analysis", Oct. 31, 2007 (Oct. 31, 2007), CRC Press, Boca Raton, FL, USA, XP055462417, pp. 133-142.

Second Written Opinion of International Application No. PCT/US2018/012589, dated Sep. 14, 2018, 5 pp.

International Preliminary Report on Patentability from International Application No. PCT/US2018/012589, dated Apr. 1, 2019, 9 pp.

(56) References Cited

OTHER PUBLICATIONS

MIT 6.02 Draft: "Chapter 3 Compression Algorithms: Huffman and Lempel-Ziv-Welch (LZW)," Lecture Notes, Feb. 13, 2012, pp. 19-32. (found http://web.mit.edu/6.02/www/s2012/handouts/3.pdf).
Biswas M., et al., "Multiple Description Wavelet Video Coding Employing a New Tree Structure", 2008 IEEE Transactions on Circuits and Systems for Video Technology, vol. 18, No. 10, pp. 1361-1368, Sep. 19, 2008.
Ma J., et al., "Compressive Video Sampling With Approximate Message Passing Decoding", 2012 IEEE Transactions on Circuits and Systems for Video Technology, vol. 22, No. 9, May 30, 2012, pp. 1354-1364.

\* cited by examiner

MULTI-TYPE-TREE FRAMEWORK FOR VIDEO CODING

This disclosure claims the benefit of U.S. Provisional Application No. 62/443,569, filed Jan. 6, 2017, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames. Reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

This disclosure describes techniques for partitioning blocks of video data using a multi-type-tree (MTT) framework. The techniques of this disclosure include determining one of a plurality of partitioning techniques at various nodes of a tree structure. Examples of the plurality of partitioning techniques may include partitioning techniques that symmetrically split a block through the center of the block, as well as partitioning techniques that split a block, either symmetrically or asymmetrically, such that the center of the block is not split. In this way, the partitioning of video blocks can be performed in a manner that leads to more efficient coding; including partitioning that better captures objects in the video data that are in the center of blocks.

This disclosure further describes techniques for applying transforms to blocks partitioned according to an MTT framework, techniques for generating and parsing syntax elements indicating how blocks are split according to the MTT framework, techniques for partitioning luma and chroma blocks according to an MTT framework, and techniques for coding (i.e., encoding and/or decoding) blocks partitioned according to an MTT framework. The techniques described in this disclosure may be used individually, or together in any combination.

In one example of the disclosure, a method of decoding video data comprises receiving an encoded block of video data, determining a transform for the encoded block of video data, wherein the transform has a size S that is not a power of two, rounding S to a power of two creating an inverse transform with a modified size S', applying the inverse transform with the modified size S' to the encoded block of video data to create residual video data, and decoding the residual video data to create a decoded block of video data.

In another example of the disclosure, a method of encoding video data comprises receiving a block of video data, predicting the block of video data to create residual video data, determining a transform for the residual video data, wherein the transform has a size S that is not a power of two, rounding S to a power of two creating a transform with a modified size S', applying the transform with the modified size S' to the residual video data to create transform coefficients, and encoding the transform coefficients in an encoded video bitstream.

In another example of the disclosure, an apparatus configured to decode video data comprises a memory configured to store the video data, and one or more processors in communication with the memory, the one or more processors configured to receive an encoded block of the video data, determine a transform for the encoded block of the video data, wherein the transform has a size S that is not a power of two, round S to a power of two creating an inverse transform with a modified size S', apply the inverse transform with the modified size S' to the encoded block of the video data to create residual video data, and decode the residual video data to create a decoded block of the video data.

In another example of the disclosure, an apparatus configured to encode video data, the apparatus comprising a memory configured to store the video data, and one or more processors in communication with the memory, the one or more processors configured to receive a block of the video data, predict the block of the video data to create residual video data, determine a transform for the residual video data, wherein the transform has a size S that is not a power of two, round S to a power of two creating a transform with a modified size S', apply the transform with the modified size S' to the residual video data to create transform coefficients, and encode the transform coefficients in an encoded video bitstream.

In another example of the disclosure, an apparatus configured to decode video data comprises means for receiving an encoded block of video data, means for determining a transform for the encoded block of video data, wherein the transform has a size S that is not a power of two, means for rounding S to a power of two creating an inverse transform with a modified size S', means for applying the inverse transform with the modified size S' to the encoded block of video data to create residual video data, and means for decoding the residual video data to create a decoded block of video data.

In another example of the disclosure, an apparatus configured to encode video data comprises means for receiving a block of video data, means for predicting the block of video data to create residual video data, means for determining a transform for the residual video data, wherein the transform has a size S that is not a power of two, means for rounding S to a power of two creating a transform with a modified size S', means for applying the transform with the modified size S' to the residual video data to create transform coefficients, and means for encoding the transform coefficients in an encoded video bitstream.

In another example, this disclosure describes a computer-readable storage medium storing instructions that, when executed, causes one or more processors of a device configured to decode video data to receive an encoded block of the video data, determine a transform for the encoded block of the video data, wherein the transform has a size S that is not a power of two, round S to a power of two creating an inverse transform with a modified size S', apply the inverse transform with the modified size S' to the encoded block of the video data to create residual video data, and decode the residual video data to create a decoded block of the video data.

In another example, this disclosure describes a computer-readable storage medium storing instructions that, when executed, causes one or more processors of a device configured to encode video data to receive a block of the video data, predict the block of the video data to create residual video data, determine a transform for the residual video data, wherein the transform has a size S that is not a power of two, round S to a power of two creating a transform with a modified size S', apply the transform with the modified size S' to the residual video data to create transform coefficients, and encode the transform coefficients in an encoded video bitstream.

The details of one or more examples are set forth in the accompanying drawings and the description below. Other features, objects, and advantages will be apparent from the description, drawings, and claims.

DETAILED DESCRIPTION

This disclosure is related to the partitioning and/or organization of blocks of video data (e.g., coding units) in block-based video coding. The techniques of this disclosure may be applied in video coding standards. In various examples described below, the techniques of this disclosure include partitioning blocks of video data using three or more different partitioning structures. In some examples, three or more different partition structures may be used at each depth of a coding tree structure. Such partitioning techniques may be referred to as multi-type-tree (MTT) partitioning. By using MTT partitioning, video data may be more flexibly partitioned, thus allowing for greater coding efficiency.

This disclosure further describes techniques for applying transforms to blocks partitioned according to an MTT framework, techniques for generating and parsing syntax elements indicating how blocks are split according to the MTT framework, techniques for partitioning luma and chroma blocks according to an MTT framework, and techniques for coding (i.e., encoding and/or decoding) blocks partitioned according to an MTT framework. The techniques described in this disclosure may be used individually, or together in any combination.

Figure 1:
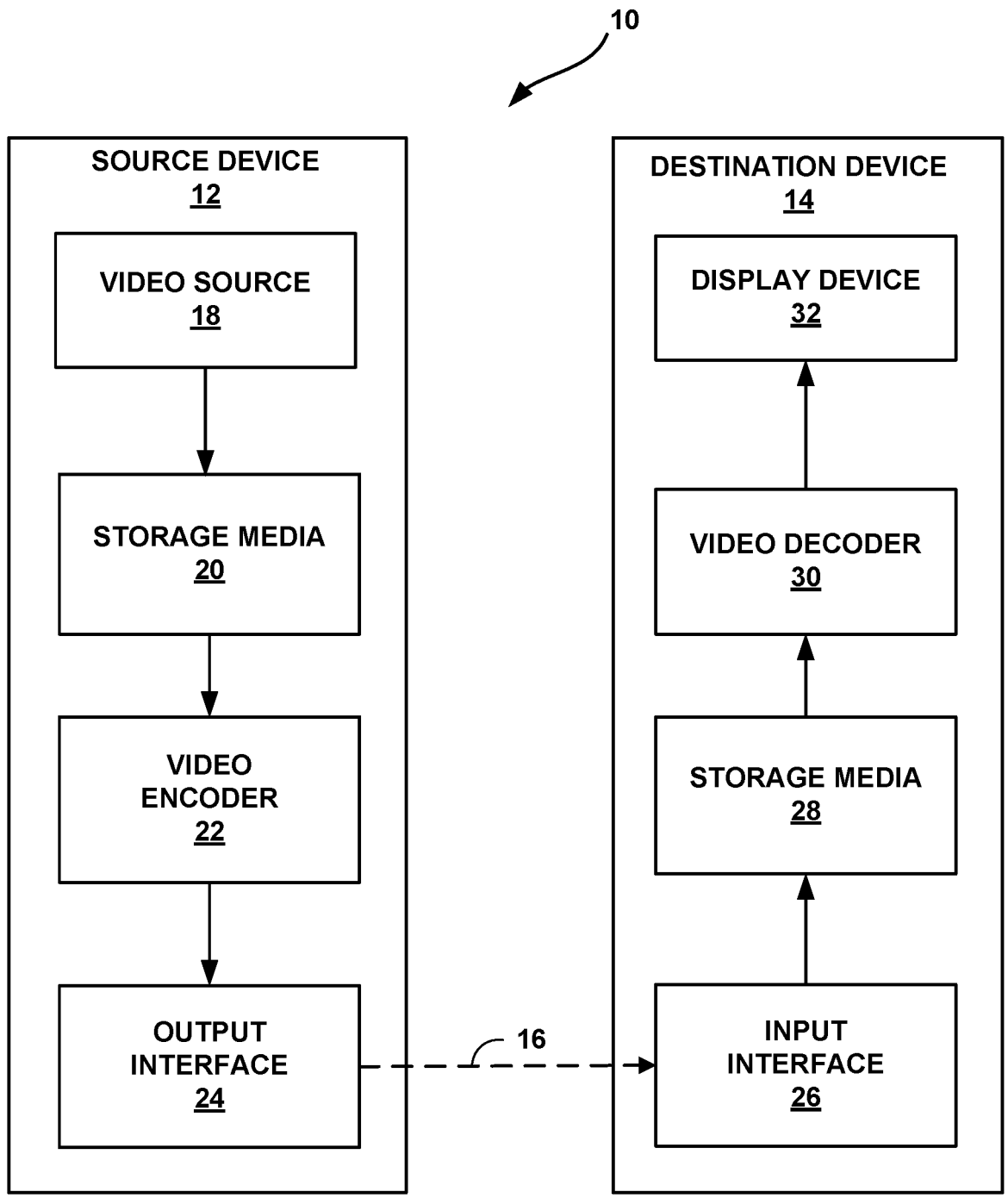
FIG. 1 is a block diagram illustrating an example video encoding and decoding system configured to implement techniques of the disclosure.

FIG. 1 is a block diagram illustrating an example video encoding and decoding system 10 that may utilize techniques of this disclosure for partitioning blocks of video data, signaling and parsing partition types, and applying transforms and further transform partitions. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (e.g., a device or apparatus for decoding video data).

In the example of FIG. 1, source device 12 includes a video source 18, a storage media 20 configured to store video data, a video encoder 22, and an output interface 24. Destination device 14 includes an input interface 26, a storage medium 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device or apparatus. Although generally the techniques of this disclosure are performed by a video encoding device and a video decoding device, the techniques may also be performed by a combined video encoder/decoder, typically referred to as a "CODEC." Source device 12 and destination device 14 are merely examples of such coding devices in which source device 12 generates encoded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 20) configured to store the video data. The techniques described in this disclosure may be applicable to video coding in general, and may be applied to wireless and/or wired applications. In each case, the captured, pre-captured, or computer-generated video may be encoded by video encoder 22. Output interface 24 may output the encoded video information to computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data (e.g., encoded video data) may be output from output interface 24 to a storage device. Similarly, encoded data may be accessed from the storage device by input interface 26. The storage device may include any of a variety of distributed or locally accessed data storage media such as a hard drive, Blu-ray discs, DVDs, CD-ROMs, flash memory, volatile or non-volatile memory, server, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, server, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 22 of video encoder 22, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user. Display device 32 may comprise any of a variety of display devices such as a liquid crystal display (LCD), a plasma display, an organic light emitting diode (OLED) display, or another type of display device.

Video encoder 22 and video decoder unit 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 22 and video decoder 30 may be included in one or more encoders or decoders, either of which may be integrated as part of a combined encoder/decoder (CODEC) in a respective device.

In some examples, video encoder 22 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. The video coding standard High Efficiency Video Coding (HEVC) or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) of ITU-T Video Coding Experts Group (VCEG) and ISO/IEC Motion Picture Experts Group (MPEG). Video encoder 22 and video decoder 30 may also be configured to operate according to a future video coding standard, such as the video coding standard being developed by the Joint Video Exploration Team (WET) group. JEM software is based on the HEVC Model (HM) software and is the reference software for the JVET.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Furthermore, in HEVC and other video coding specifications, to generate an encoded representation of a picture, video encoder 22 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

If operating according to HEVC, to generate a coded CTU, video encoder 22 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Syntax data within a bitstream may also define a size for the CTU. A slice includes a number of consecutive CTUs in coding order. A video frame or picture may be partitioned into one or more slices. As mentioned above, each tree block may be split into coding units (CUs) according to a quad-tree. In general, a quad-tree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. If a block of CU is split further, it may be generally referred to as a non-leaf-CU. In some examples of this disclosure, four sub-CUs of a leaf-CU may be referred to as leaf-CUs even if there is no explicit splitting of the original leaf-CU. For example, if a CU at 16×16 size is not split further, the four 8×8 sub-CUs may also be referred to as leaf-CUs although the 16×16 CU was never split.

A CU has a similar purpose as a macroblock of the H.264 standard, except that a CU does not have a size distinction. For example, a tree block may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a tree block may be split, referred to as a maximum CU depth, and may also define a minimum size of the coding nodes. The depth a treeblock structure may indicate the number of times a block has been split. For example, depth 0 may relate to a block before any splitting, depth 1 may relate to blocks created from one splitting of the parent block, depth 2 may relate to blocks created from one splitting of a block at depth 1, and so on. A bitstream may also define a smallest coding unit (SCU). This disclosure uses the term "block" to refer to any of a CU, PU, or TU, in the context of HEVC, or similar data structures in the context of other standards (e.g., coding units in JEM, macroblocks and sub-blocks thereof in H.264/AVC, etc.).

A CU includes a coding node as well as prediction units (PUs) and transform units (TUs) associated with the coding node. A size of the CU corresponds to a size of the coding node and may be, in some examples, square in shape. In the example of HEVC, the size of the CU may range from 8×8 pixels up to the size of the tree block with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs. The TUs may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quad-tree structure, sometimes called a "residual quad tree" (RQT). The leaf nodes of the RQT may be referred to as TUs. Pixel difference values associated with the TUs may be transformed to produce transform coefficients, which may be quantized.

A leaf-CU may include one or more PUs. In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a RQT, which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more TUs. The TUs may be specified using an RQT (also referred to as a TU quad-tree structure), as discussed above. For example, a split flag may indicate whether a leaf-CU is split into four transform units. In some examples, each transform unit may be split further into further sub-TUs. When a TU is not split further, it may be referred to as a leaf-TU. Generally, for intra coding, all the leaf-TUs belonging to a leaf-CU contain residual data produced from the same intra prediction mode. That is, the same intra-prediction mode is generally applied to calculate predicted values that will be transformed in all TUs of a leaf-CU. For intra coding, video encoder 22 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective RQT structures. That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU).

As discussed above, video encoder 22 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 22 may generate predictive blocks (e.g., luma, Cb, and Cr predictive blocks) for prediction blocks (e.g., luma, Cb, and Cr prediction blocks) of each PU of the CU.

Video encoder 22 may use intra prediction or inter prediction to generate the predictive blocks for a PU. If video encoder 22 uses intra prediction to generate the predictive blocks of a PU, video encoder 22 may generate the predictive blocks of the PU based on decoded samples of the picture that includes the PU.

After video encoder 22 generates predictive blocks (e.g., luma, Cb, and Cr predictive blocks) for one or more PUs of a CU, video encoder 22 may generate one or more residual blocks for the CU. For instance, video encoder 22 may generate a luma residual block for the CU. Each sample in the CU's luma residual block indicates a difference between a luma sample in one of the CU's predictive luma blocks and a corresponding sample in the CU's original luma coding block. In addition, video encoder 22 may generate a Cb residual block for the CU. Each sample in the Cb residual block of a CU may indicate a difference between a Cb sample in one of the CU's predictive Cb blocks and a corresponding sample in the CU's original Cb coding block. Video encoder 22 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, as discussed above, video encoder 22 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 22 may apply one or more transforms a transform block of a TU to generate a coefficient block for the TU. For instance, video encoder 22 may apply one or more transforms to a luma transform block of a TU to generate a luma coefficient block for the TU. A coefficient block may be a two-dimensional array of transform coefficients. A transform coefficient may be a scalar quantity. Video encoder 22 may apply one or more transforms to a Cb transform block of a TU to generate a Cb coefficient block for the TU. Video encoder 22 may apply one or more transforms to a Cr transform block of a TU to generate a Cr coefficient block for the TU.

In some examples, video encoder 22 skips application of the transforms to the transform block. In such examples, video encoder 22 may treat residual sample values in the same way as transform coefficients. Thus, in examples where video encoder 22 skips application of the transforms, the following discussion of transform coefficients and coefficient blocks may be applicable to transform blocks of residual samples.

After generating a coefficient block (e.g., a luma coefficient block, a Cb coefficient block or a Cr coefficient block), video encoder 22 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 22 may quantize transform coefficients of the coefficient block. After video encoder 22 quantizes a coefficient block, video encoder 22 may entropy encode syntax elements indicating the quantized transform coefficients. For example, video encoder 22 may perform Context-Adaptive Binary Arithmetic Coding (CABAC) or other entropy coding techniques on the syntax elements indicating the quantized transform coefficients.

Video encoder 22 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 22. Video decoder 30 may decode the bitstream to reconstruct pictures of the video data. As part of decoding the bitstream, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 22. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Common concepts and certain design aspects of HEVC are described below, focusing on techniques for block partition. In HEVC, the largest coding unit in a slice is called a CTB. A CTB is divided according to a quad-tree structure, the nodes of which are coding units. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. The root node corresponds to an initial video block of the video data (e.g., a CTB). For each respective non-root node of the plurality of nodes, the respective non-root node corresponds to a video block that is a sub-block of a video block corresponding to a parent node in the tree structure of the respective non-root node. Each respective non-leaf node of the plurality of non-leaf nodes has one or more child nodes in the tree structure.

Figure 2:
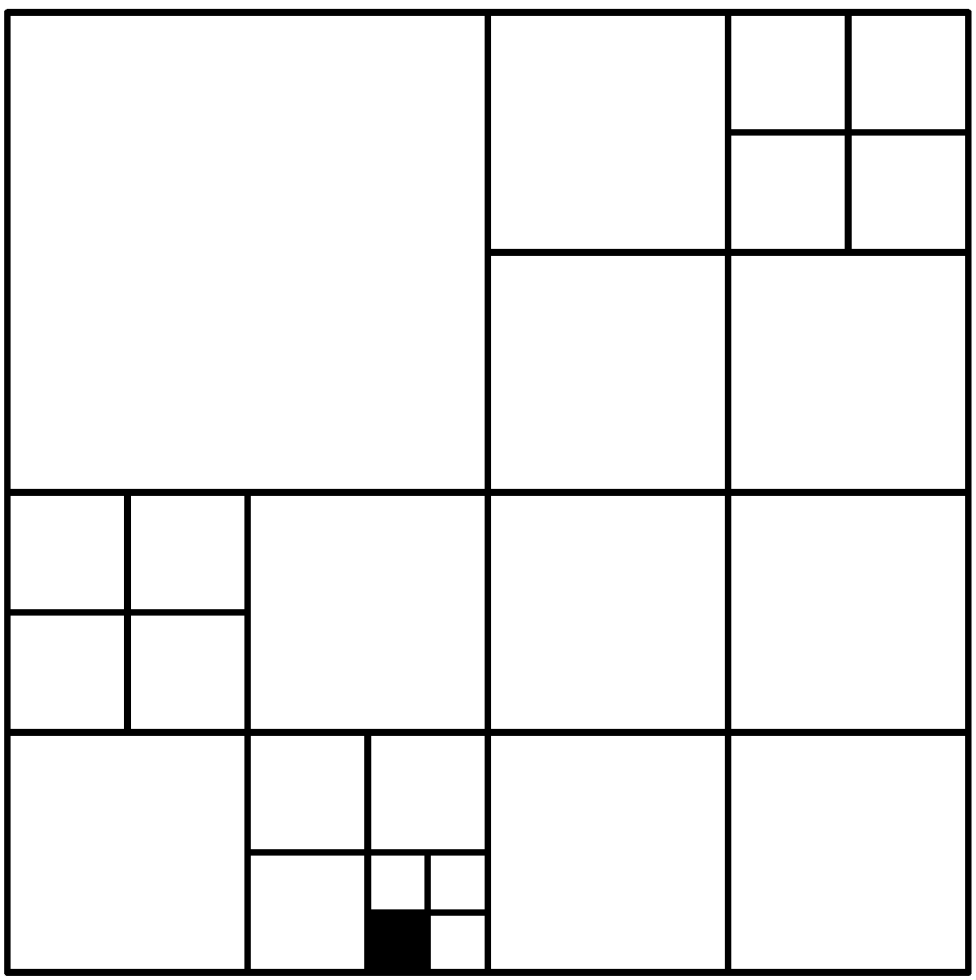
FIG. 2 is a conceptual diagram illustrating coding unit (CU) structure in High Efficiency Video Coding (HEVC).

The size of a CTB range from 16×16 to 64×64 in the HEVC main profile (although technically 8×8 CTB sizes can be supported). A CTB may be recursively split into CUs in a quad-tree manner, as described in W. J. Han et al, "Improved Video Compression Efficiency Through Flexible Unit Representation and Corresponding Extension of Coding Tools", IEEE Transaction on Circuits and Systems for Video Technology, vol. 20, no. 12, pp. 1709-1720, December 2010, and shown in FIG. 2. As shown in FIG. 2, each level of partitioning is a quad-tree split into four sub-blocks. The black block is an example of a leaf-node (i.e., a block that is not further split).

In some examples, a CU may be the same size of a CTB, although a CU can be as small as 8×8. Each CU is coded with one coding mode, which could be, e.g., an intra coding mode or an inter coding mode. Other coding modes are also possible, including coding modes for screen content (e.g., intra block copy modes, palette-based coding modes, etc.). When a CU is inter coded (i.e., inter mode is applied), the CU may be further partitioned into prediction units (PUs). For example, a CU may be partitioned in to 2 or 4 PUs. In another example, the entire CU is treated as a single PU when further partitioning is not applied. In HEVC examples, when two PUs are present in one CU, they can be half size rectangles or two rectangle size with ¼ or ¾ size of the CU.

Figure 3:
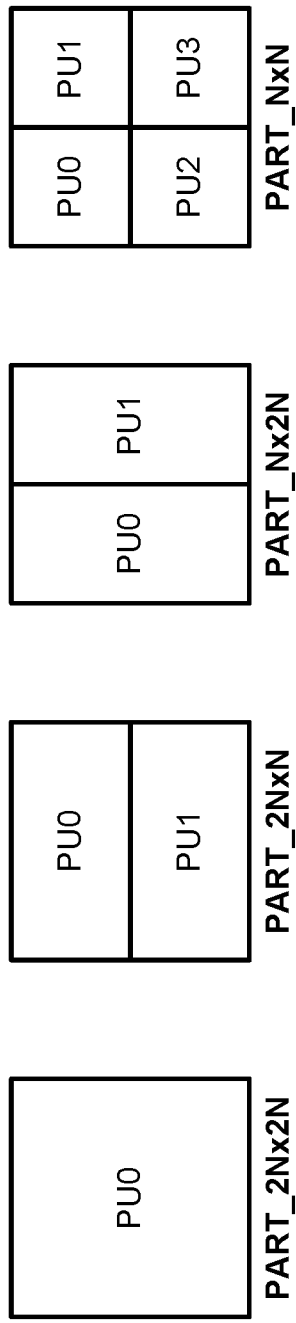
FIG. 3 is a conceptual diagram illustrating example partition types for an inter prediction mode.
Figure 3:
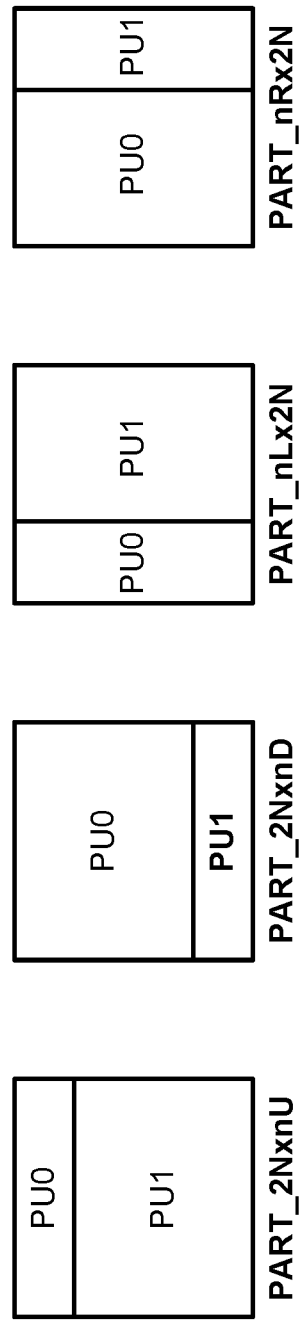

In HEVC, there are eight partition modes for a CU coded with inter prediction mode, i.e., PART_2N×2N, PART_2N× N, PART_N×2N, PART_N×N, PART_2N×nU, PART_2N× nD, PART_nL×2N and PART_nR×2N, as shown in FIG. 3. As shown in FIG. 3, a CU coded with partition mode PART_2N×2N is not further split. That is, the entire CU is treated as a single PU (PU0). A CU coded with partition mode PART_2N×N is symmetrically horizontally split into two PUs (PU0 and PU1). A CU coded with partition mode PART_N×2N is symmetrically vertically split into two PUs. A CU coded with partition mode PART_N×N is symmetrically split into four equal-sized PUs (PU0, PU1, PU2, PU3).

A CU coded with partition mode PART_2N×nU is asymmetrically horizontally split into one PU0 (the upper PU) having ¼ the size of the CU and one PU1 (the lower PU) having ¾ the size of the CU. A CU coded with partition mode PART_2N×nD is asymmetrically horizontally split into one PU0 (the upper PU) having ¾ the size of the CU and one PU1 (the lower PU) having ¼ the size of the CU. A CU coded with partition mode PART_nL×2N is asymmetrically vertically split into one PU0 (the left PU) having ¼ the size of the CU and one PU1 (the right PU) having ¾ the size of the CU. A CU coded with partition mode PART_nR×2N is asymmetrically vertically split into one PU0 (the left PU) having ¾ the size of the CU and one PU1 (the right PU) having ¼ the size of the CU.

When a CU is inter coded, one set of motion information (e.g., motion vector, prediction direction, and reference picture) is present for each PU. In addition, each PU is coded with a unique inter prediction mode to derive the set of motion information. However, it should be understood that even if two PUs are coded uniquely, they may still have the same motion information in some circumstances.

In J. An et al., "Block partitioning structure for next generation video coding", International Telecommunication Union, COM16-C966, September 2015 (hereinafter, "VCEG proposal COM16-C966"), quad-tree-binary-tree (QTBT) partitioning techniques were proposed for future video coding standard beyond HEVC. Simulations have shown that the proposed QTBT structure is more efficient than the quad-tree structure in used HEVC.

In the proposed QTBT structure of VCEG proposal COM16-C966, a CTB is first partitioned using quad-tree portioning techniques, where the quad-tree splitting of one node can be iterated until the node reaches the minimum allowed quad-tree leaf node size. The minimum allowed quad-tree leaf node size may be indicated to video decoder by the value of the syntax element MinQTSize. If the quad-tree leaf node size is not larger than the maximum allowed binary-tree root node size (e.g., as denoted by a syntax element MaxBTSize), the quad-tree leaf node can be further partitioned using binary-tree partitioning. The binary-tree partitioning of one node can be iterated until the node reaches the minimum allowed binary-tree leaf node size (e.g., as denoted by a syntax element MinBTSize) or the maximum allowed binary-tree depth (e.g., as denoted by a syntax element MaxBTDepth). VCEG proposal COM16-C966 uses the term "CU" to refer to binary-tree leaf nodes. In VCEG proposal COM16-C966, CUs are used for prediction (e.g., intra prediction, inter prediction, etc.) and transform without any further partitioning. In general, according to QTBT techniques, there are two splitting types for binary-tree splitting: symmetric horizontal splitting and symmetric vertical splitting. In each case, a block is split by dividing the block down the middle, either horizontally or vertically.

In one example of the QTBT partitioning structure, the CTU size is set as 128×128 (e.g., a 128×128 luma block and two corresponding 64×64 chroma blocks), the MinQTSize is set as 16×16, the MaxBTSize is set as 64×64, the MinBTSize (for both width and height) is set as 4, and the MaxBTDepth is set as 4. The quad-tree partitioning is applied to the CTU first to generate quad-tree leaf nodes. The quad-tree leaf nodes may have a size from 16×16 (i.e., the MinQTSize is 16×16) to 128×128 (i.e., the CTU size). According to one example of QTBT partitioning, if the leaf quad-tree node is 128×128, the leaf quad-tree node cannot be further split by the binary-tree since the size of the leaf quad-tree node exceeds the MaxBTSize (i.e., 64×64). Otherwise, the leaf quad-tree node is further partitioned by the binary-tree. Therefore, the quad-tree leaf node is also the root node for the binary-tree and has the binary-tree depth as 0. The binary-tree depth reaching MaxBTDepth (e.g., 4) implies that there is no further splitting. The binary-tree node having a width equal to the MinBTSize (e.g., 4) implies that there is no further horizontal splitting. Similarly, the binary-tree node having a height equal to MinBTSize implies no further vertical splitting. The leaf nodes of the binary-tree (CUs) are further processed (e.g., by performing a prediction process and a transform process) without any further partitioning.

Figures 4A, 4B:
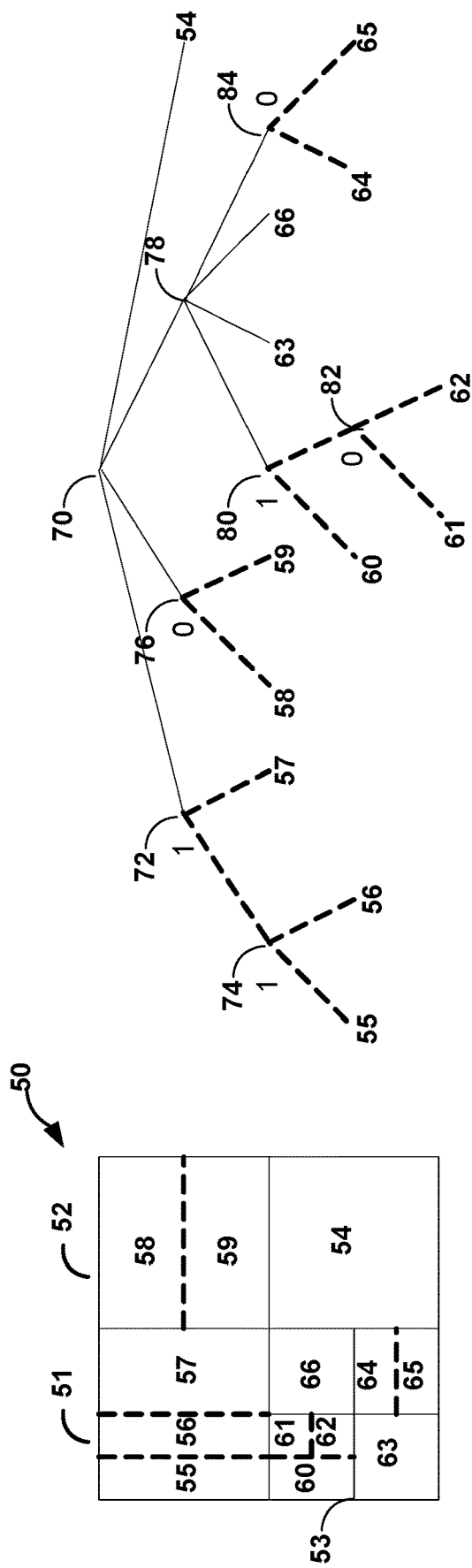
FIG. 4A is a conceptual diagram illustrating an example of block partitioning using a quad-tree-binary-tree (QTBT) structure.
FIG. 4B is a conceptual diagram illustrating an example tree structure corresponding to the block partitioning using the QTBT structure of FIG. 4A.

FIG. 4A illustrates an example of a block 50 (e.g., a CTB) partitioned using QTBT partitioning techniques. As shown in FIG. 4A, using QTBT partition techniques, each of the resultant blocks is split symmetrically through the center of each block. FIG. 4B illustrates the tree structure corresponding to the block partitioning of FIG. 4B. The solid lines in FIG. 4B indicate quad-tree splitting and dotted lines indicate binary-tree splitting. In one example, in each splitting (i.e., non-leaf) node of the binary-tree, a syntax element (e.g., a flag) is signaled to indicate the type of splitting performed (e.g., horizontal or vertical), where 0 indicates horizontal splitting and 1 indicates vertical splitting. For the quad-tree splitting, there is no need to indicate the splitting type, as quad-tree splitting always splits a block horizontally and vertically into 4 sub-blocks with an equal size.

As shown in FIG. 4B, at node 70, block 50 is split into the four blocks 51, 52, 53, and 54, shown in FIG. 4A, using QT partitioning. Block 54 is not further split, and is therefore a leaf node. At node 72, block 51 is further split into two blocks using BT partitioning. As shown in FIG. 4B, node 72 is marked with a 1, indicating vertical splitting. As such, the splitting at node 72 results in block 57 and the block including both blocks 55 and 56. Blocks 55 and 56 are created by a further vertical splitting at node 74. At node 76, block 52 is further split into two blocks 58 and 59 using BT partitioning. As shown in FIG. 4B, node 76 is marked with a 1, indicating horizontal splitting.

At node 78, block 53 is split into 4 equal size blocks using QT partitioning. Blocks 63 and 66 are created from this QT partitioning and are not further split. At node 80, the upper left block is first split using vertical binary-tree splitting resulting in block 60 and a right vertical block. The right vertical block is then split using horizontal binary-tree splitting into blocks 61 and 62. The lower right block created from the quad-tree splitting at node 78, is split at node 84 using horizontal binary-tree splitting into blocks 64 and 65.

Although the QTBT structure described above shows better coding performance than the quad-tree structure used in HEVC, the QTBT structure lacks flexibility. For example, in the QTBT structure described above, a quad-tree node can be further split with a binary-tree, but a binary-tree node cannot be further split with quad-tree. In another example, both quad-tree and binary-tree can only achieve even splitting (i.e., splitting down the center of the block), which is not efficient when an object is in the center of a block to be split. Therefore, the coding performance of QTBT may be lacking for future video coding standards.

To address the problems mentioned above, U.S. Patent Publication No. 20170208336, filed Jan. 12, 2017 and U.S. Patent Publication No. 20170272782, filed Mar. 20, 2017, both of which are incorporated by reference herein, describe various examples of a multi-type-tree (MTT) partition structure. According to an MTT partition structure, a tree node may be further split with multiple tree types, such as binary-tree, symmetric center-side triple-tree, and quad-tree. Simulations have shown that the multi-type-tree structure was much more efficient than quad-tree-binary-tree structure.

To better achieve more flexible partitioning for a CTU, a MTT based CU structure is proposed to replace QT, BT, and/or QTBT based CU structures. The MTT partitioning structure of this disclosure is still a recursive tree structure. However, multiple different partition structures (e.g., three or more) are used. For example, according to the MTT techniques of this disclosure, three or more different partition structures may be used at each depth of a tree structure. In this context, the depth of a node in a tree structure may refer to the length of the path (e.g., the number of splits) from the node to the root of the tree structure.

In one example in accordance with the techniques of this disclosure, video encoder 22 and/or video decoder 30 may be configured to receive a picture of video data, and partition the picture of video data into a plurality of blocks using three or more different partition structures, and reconstruct/encode the plurality of blocks of the picture of video data. In one example, partitioning the picture of video data comprises partitioning the picture of video data into the plurality of blocks using the three or more different partition structures, wherein at least three of the three or more different partition structures may be used at each depth of a tree structure that represents how the picture of video data is partitioned. In one example, the three or more different partition structures include a triple-tree partition structure, and video encoder 22 and/or video decoder 30 may be configured to partition one of the plurality of blocks of video data using a triple-tree partition type of the triple-tree partition structure, wherein the triple-tree partition structure divides the one of the plurality of blocks of into three sub-blocks without dividing the one of the plurality of blocks through the center. In a further example of the disclosure, the three or more different partition structures further include a quad-tree partition structure and a binary-tree partition structure.

Thus, in one example, video encoder 22 may generate an encoded representation of an initial video block (e.g., a coding tree block or CTU) of video data. As part of generating the encoded representation of the initial video block, video encoder 22 determines a tree structure comprising a plurality of nodes. For example, video encoder 22 may partition a tree block using the MTT partitioning structure of this disclosure.

The plurality of nodes in the MTT partitioning structure includes a plurality of leaf nodes and a plurality of non-leaf nodes. The leaf nodes have no child nodes in the tree structure. The non-leaf nodes include a root node of the tree structure. The root node corresponds to the initial video block. For each respective non-root node of the plurality of nodes, the respective non-root node corresponds to a video block (e.g., a coding block) that is a sub-block of a video block corresponding to a parent node in the tree structure of the respective non-root node. Each respective non-leaf node of the plurality of non-leaf nodes has one or more child nodes in the tree structure. In some examples, a non-leaf node at a picture boundary may only have one child node due to a forced split and one of the child nodes corresponds to a block outside the picture boundary.

According to the techniques of this disclosure, for each respective non-leaf node of the tree structure at each depth level of the tree structure, there is a plurality of allowed splitting patterns (e.g., partition structure) for the respective non-leaf node. For example, there may be three or more partition structures allowed for each depth of the tree structure. Video encoder 22 may be configured to partition a video block corresponding to the respective non-leaf node into video blocks corresponding to the child nodes of the respective non-leaf node according to one of the plurality of allowable partition structure. Each respective allowed partition structure of the plurality of allowed partition structures may correspond to a different way of partitioning the video block corresponding to the respective non-leaf node into video blocks corresponding to the child nodes of the respective non-leaf node. Furthermore, in this example, video encoder 22 may include the encoded representation of the initial video block in a bitstream that comprises an encoded representation of the video data.

In a similar example, video decoder 30 may determine a tree structure comprising a plurality of nodes. As in the previous example, the plurality of nodes includes a plurality of leaf nodes and a plurality of non-leaf nodes. The leaf nodes have no child nodes in the tree structure. The non-leaf nodes include a root node of the tree structure. The root node corresponds to an initial video block of the video data. For each respective non-root node of the plurality of nodes, the respective non-root node corresponds to a video block that is a sub-block of a video block corresponding to a parent node in the tree structure of the respective non-root node. Each respective non-leaf node of the plurality of non-leaf nodes has one or more child nodes in the tree structure. For each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns. Each respective allowed splitting pattern of the plurality of allowed splitting patterns corresponds to a different way of partitioning the video block corresponding to the respective non-leaf node into video blocks corresponding to the child nodes of the respective non-leaf node. Furthermore, in this example, for each (or at least one) respective leaf node of the tree structure, video decoder 30 reconstructs the video block corresponding to the respective leaf node.

In some such examples, for each respective non-leaf node of the tree structure other than the root node, the plurality of allowed splitting patterns (e.g., partition structures) for the respective non-leaf node is independent of the partition structure according to which a video block corresponding to a parent node of the respective non-leaf node is partitioned into video blocks corresponding to child nodes of the parent node of the respective non-leaf node.

In other examples of the disclosure, at each depth of the tree structure, video encoder 22 may be configured to further split sub-trees using a particular partition type from among one of three more partitioning structures. For example, video encoder 22 may be configured to determine a particular partition type from QT, BT, triple-tree (TT) and other partitioning structures. In one example, the QT partitioning structure may include square quad-tree and rectangular quad-tree partitioning types. Video encoder 22 may partition a square block using square quad-tree partitioning by dividing the block, down the center both horizontally and vertically, into four equal-sized square blocks. Likewise, video encoder 22 may partition a rectangular (e.g., non-square) block using rectangular quad-tree partition by dividing the rectangular block, down the center both horizontally and vertically, into four equal-sized rectangular blocs.

The BT partitioning structure may include horizontal symmetric binary-tree, vertical symmetric binary-tree, horizontal non-symmetric binary-tree, and vertical non-symmetric binary-tree partition types. For the horizontal symmetric binary-tree partition type, video encoder 22 may be configured to split a block, down the center of the block horizontally, into two symmetric blocks of the same size. For the vertical symmetric binary-tree partition type, video encoder 22 may be configured to split a block, down the center of the block vertically, into two symmetric blocks of the same size. For the horizontal non-symmetric binary-tree partition type, video encoder 22 may be configured to split a block, horizontally, into two blocks of differing size. For example, one block may be ¼ the size of the parent block and the other block may be ¾ the size of the parent blocks, as in the PART_2N×nU or PART_2N×nD partition type of FIG. 3. For the vertical non-symmetric binary-tree partition type, video encoder 22 may be configured to split a block, vertically, into two blocks of differing size. For example, one block may be ¼ the size of the parent block and the other block may be ¾ the size of the parent blocks, as in the PART_nL×2N or PART_nR×2N partition type of FIG. 3.

In other examples, an asymmetric binary-tree partition type may divide a parent block into different size fractions. For example, one sub-block may be ⅜ of the parent block and the other sub-block may be ⅝ of the parent block. Of course, such a partition type may be either vertical or horizontal.

Figure 5E:
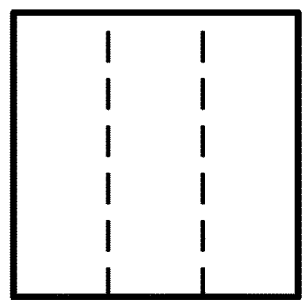
FIG. 5E is a conceptual diagram illustrating horizontal center-side tree partitioning.

The TT partition structure differs from that of the QT or BT structures, in that the TT partition structure does not split a block down the center. The center region of the block remains together in the same sub-block. Different from QT, which produces four blocks, or binary tree, which produces two blocks, splitting according to a TT partition structure produces three blocks. Example partition types according to the TT partition structure include horizontal symmetric triple-tree, vertical symmetric triple-tree, horizontal non-symmetric triple-tree, and vertical non-symmetric triple-tree partition types. For the horizontal symmetric triple-tree partition type, video encoder 22 may be configured to split a block, horizontally, into three blocks without splitting the blocks down the center. When divided according to horizontal symmetric triple-tree partitioning the blocks above and below the center sub-block are mirrored, i.e., they are the same size. If a block is directly divisible by three (e.g., 12 samples tall), the center block may be the same size as the upper and lower blocks. If a block is not directly divisible by three (e.g., 8 samples tall), the center block may be a different size than the upper and lower blocks. For example, for a block 8 samples tall, the upper and lower blocks may be 3 samples tall and the center block may be 2 samples tall. In another example, for a block 8 samples tall, the upper and lower blocks may be 2 samples tall, and the center block may be 4 samples tall. FIG. 5E shows an example of horizontal triple-tree partitioning.

Figure 5D:
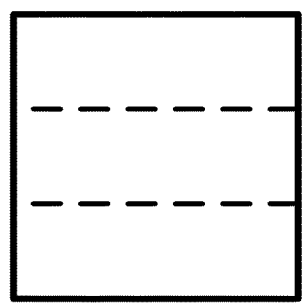
FIG. 5D is a conceptual diagram illustrating vertical center-side tree partitioning.

For the vertical symmetric triple-tree partition type, video encoder 22 may be configured to split a block, vertically, into three blocks without splitting the blocks down the center. When divided according to vertical symmetric triple-tree partitioning the blocks to the left and to the right of the center sub-block are mirrored, i.e., they are the same size. If a block is directly divisible by three (e.g., 12 samples wide), the center block may be the same size as the left and right blocks. If a block is not directly divisible by three (e.g., 8 samples wide), the center block may be a different size than the left and right blocks. For example, for a block 8 samples wide, the left and right blocks may be 3 samples wide and the center block may be 2 samples wide. In another example, for a block 8 samples wide, the left and right blocks may be 2 samples wide, and the center block may be 4 samples wide. FIG. 5D shows an example of vertical triple-tree partitioning.

For the horizontal non-symmetric triple-tree partition type, video encoder 22 may be configured to split a block, horizontally, into three blocks which are not symmetrically mirrored. In some examples, the horizontal non-symmetric triple-tree partition type may split a block down the center, and in other examples the horizontal non-symmetric triple-tree partition type may not split a block down the center. For the vertical non-symmetric triple-tree partition type, video encoder 22 may be configured to split a block, vertically, into three blocks that are not symmetrically mirrored. In some example, the vertical non-symmetric triple-tree partition type may split a block down the center, and in other examples the vertical non-symmetric triple-tree partition type may not split a block down the center.

In examples where a block (e.g., at a sub-tree node) is split to a non-symmetric triple-tree partition type, video encoder 22 and/or video decoder 30 may apply a restriction such that two of the three partitions have the same size. Such a restriction may correspond to a limitation to which video encoder 22 must comply when encoding video data. Furthermore, in some examples, video encoder 22 and video decoder 30 may apply a restriction whereby the sum of the area of two partitions is equal to the area of the remaining partition when splitting according to a non-symmetric triple-tree partition type. For instance, video encoder 22 may generate or video decoder 30 may receive an encoded representation of the initial video block that complies with a restriction specifying that when a video block corresponding to a node of the tree structure is partitioned according to a non-symmetric triple-tree pattern, the node has a first child node, a second child node, and a third child node, the second child node corresponding to a video block between video blocks corresponding to the first and third child nodes, the video blocks corresponding to the first and third child nodes have the same size, and a sum of the sizes of the video blocks corresponding to the first and third child nodes is equal to a size of the video block corresponding to the second child node.

In some examples of the disclosure, video encoder 22 may be configured to select from among all the of the aforementioned partition types for each of the QT, BT, and TT partition structures. In other examples, video encoder 22 may be configured to only determine a partition type from among a subset of the aforementioned partition types. For example, a subset of the above-discussed partition types (or other partition types) may be used for certain block sizes or for certain depths of a quadtree structure. The subset of supported partition types may be signaled in the bitstream for use by video decoder 30 or may be predefined such that video encoder 22 and video decoder 30 may determine the subsets without any signaling.

In other examples, the number of supported partitioning types may be fixed for all depths in all CTUs. That is, video encoder 22 and video decoder 30 may be preconfigured to use the same number of partitioning types for any depth of a CTU. In other examples, the number of supported partitioning types may vary and may be dependent on depth, slice type, or other previously coded information. In one example, at depth 0 or depth 1 of the tree structure, only the QT partition structure is used. At depths greater than 1, each of the QT, BT, and TT partition structures may be used.

In some examples, video encoder 22 and/or video decoder 30 may apply preconfigured constraints on supported partitioning types in order to avoid duplicated partitioning for a certain region of a video frame or region of a CTU. In one example, when a block is split with non-symmetric partition type, video encoder 22 and/or video decoder 30 may be configured to not further split the largest sub-block that is split from the current block. For example, when a square block is split according to a non-symmetric partition type (e.g., PART_2N×nU partition type in FIG. 3), the largest sub-block among all sub-blocks (e.g., PU1 of PART_2N×nU partition type in FIG. 3) is the noted leaf node and cannot be further split. However, the smaller sub-block (e.g., PU0 of PART_2N×nU partition type in FIG. 3) can be further split.

As another example where constraints on supported partitioning types may be applied to avoid duplicated partitioning for a certain region, when a block is split with non-symmetric partition type, the largest sub-block that is split from the current block cannot be further split in the same direction. For example, when a square block is split non-symmetric partition type (e.g., PART_2N×nU partition type in FIG. 3), video encoder 22 and/or video decoder 30 may be configured to not split the large sub-block among all sub-blocks (e.g. PU1 of PART_2N×nU partition type in FIG. 3) in the horizontal direction. However, video encoder 22 and/or video decoder 30, in this example, may split PU1 again in the vertical direction.

As another example where constraints on supported partitioning types may be applied to avoid difficulty in further splitting, video encoder 22 and/or video decoder 30 may be configured to not split a block, either horizontally or vertically, when the width/height of a block is not a power of 2 (e.g., when the width height is not 2, 4, 8, 16, etc.).

The above examples describe how video encoder 22 may be configured to perform MTT partitioning according techniques of this disclosure. Video decoder 30 may also then apply the same MTT partitioning as was performed by video encoder 22. In some examples, how a frame of video data was partitioned by video encoder 22 may be determined by applying the same set of predefined rules at video decoder 30. However, in many situations, video encoder 22 may determine a particular partition structure and partition type to use based on rate-distortion criteria for the particular frame of video data being coded. As such, in order for video decoder 30 to determine the partitioning for a particular frame, video encoder 22 may signal syntax elements in the encoded bitstream that indicate how the frame, and CTUs of the frame, are to be partitioned. Video decoder 30 may parse such syntax elements and partition the frame and CTUs accordingly.

In one example of the disclosure, video encoder 22 may be configured to signal a particular subset of supported partition types as a high-level syntax element, in a sequence parameter set (SPS), a picture parameter set (PPS), slice header, adaptive parameter set (APS), or any other high-level syntax parameter set. For example, the maximum number of partition types and which types are supported may be predefined, or signaled in bitstream as a high-level syntax element, in sequence parameter set (SPS), picture parameter set (PPS) or any other high-level syntax parameter sets. Video decoder 30 may be configured to receive and parse such a syntax element to determine the particular subset of partition types that are use and/or the maximum number of partition structures (e.g., QT, BT, TT, etc.) and types that are supported.

In some examples, at each depth, video encoder 22 may be configured to signal an index that indicates the selected partitioning type used at that depth of the tree structure. Furthermore, in some examples, video encoder 22 may adaptively signal such a partition type index at each CU, i.e., the index could be different for different CUs. For instance, video encoder 22 may set the index of the partitioning type based on one or more rate-distortion calculations. In one example, the signaling of the partitioning type (e.g., the index of the partitioning type) may be skipped if certain condition is satisfied. For example, video encoder 22 may skip signaling of the partition type when there is only one supported partitioning type associated with a specific depth. In this example, when nearing a picture boundary, a region to be coded may be smaller than a CTU. Consequently, in this example, CTUs may be forced to be split to fit for the picture boundary. In one example, only symmetric binary-tree is used for the forced split and no partitioning type is signaled. In some examples, at a certain depth, the partitioning type may be derived based on previously coded information, such as slice type, CTU depth, CU position.

In another example of the disclosure, for each CU (leaf node), video encoder 22 may be further configured to signal a syntax element (e.g., a one-bit transform_split flag) to indicate whether a transform is to be performed on the same size of the CU or not (i.e., the flag indicates whether the TU is the same size of the CU or is further split). In case the transform_split flag is signaled as true, video encoder 22 may be configured to further split the residual of the CU into multiple sub-blocks and the transform is done on each sub-block. Video decoder 30 may perform the reciprocal process.

In one example, when the transform_split flag is signaled as true, the following is performed. If the CU corresponds to a square block (i.e., the CU is square), then video encoder 22 splits the residual into four square sub-blocks using quad-tree splitting, and the transform is performed on each square sub-block. If the CU corresponds to a non-square block, e.g., M×N, then video encoder 22 splits the residual into two sub-blocks, and the sub-block size is 0.5M×N when M>N, and M×0.5N when M<N. As another example, when the transform_split flag is signaled as true and the CU corresponds to a non-square block, e.g., M×N, (i.e., the CU is non-square), video encoder 22 may be configured to split the residual into sub-blocks with size K×K, and the K×K square transform is used for each sub-block, where K is equal to the maximal factor of M and N. As another example, no transform_split flag is signaled when a CU is a square block.

In some examples, no split flag is signaled and only a transform with one derived size is used for when there is residue in the CU after prediction. For example, a CU with size equal to M×N, the K×K square transform is used, where K is equal to the maximal factor of M and N. Thus, in this example, for a CU with size 16×8, the same 8×8 transform may be applied to two 8×8 sub-blocks of residual data of the CU. A "split flag" is a syntax element indicating that a node in a tree structure has child nodes in the tree structure.

In some examples, for each CU, if the CU is not split to a squared quad-tree, or a symmetric binary-tree, video encoder 22 is configured to always set the transform size equal to the size of the partition (e.g., the size the CU).

It should be understood that, for each of the above examples described with reference to video encoder 22, video decoder 30 may be configured to perform a reciprocal process. With regard to signaling syntax elements, video decoder 30 may be configured to receive and parse such syntax element and partition and decode the associated video data accordingly.

In one specific example of the disclosure, video decoder may be configured to partition video blocks according to three different partition structures (QT, BT, and TT), with five different partitioning types allowed at each depth. The partitioning types include quad-tree partitioning (QT partition structure), horizontal binary-tree partitioning (BT partition structure), vertical binary-tree partitioning (BT partition structure), horizontal center-side triple-tree partitioning (TT partition structure), and vertical center-side tripe-tree partitioning (TT partition structure), as shown in FIGS. 5A-5E.

The definitions of the five example partitioning types are as follows. Please note that square is regarded as a special case of rectangular.

Figure 5C:
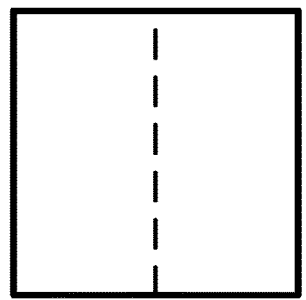
FIG. 5C is a conceptual diagram illustrating horizontal binary-tree partitioning.
Figure 5B:
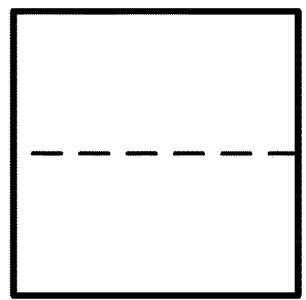
FIG. 5B is a conceptual diagram illustrating vertical binary-tree partitioning.
Figure 5A:
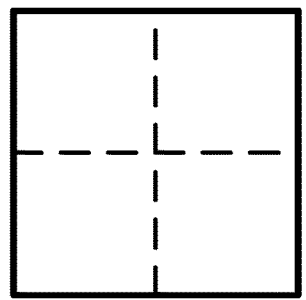
FIG. 5A is a conceptual diagram illustrating quad-tree partitioning.

Quad-tree partitioning: a block is further split into four same-size rectangular blocks. FIG. 5A shows an example of quad-tree partitioning.

Vertical binary-tree partitioning: a block is vertically split into two same-size rectangular blocks. FIG. 5B is an example of vertical binary-tree partitioning.

Horizontal binary-tree partitioning: a block is horizontally split into two same-size rectangular blocks. FIG. 5C is an example of horizontal binary-tree partitioning.

Vertical center-side triple-tree partitioning: a block is vertically split into three rectangular blocks so that the two side blocks share the same size while the size of the center block is the sum of the two side blocks. FIG. 5D is an example of vertical center-side triple-tree partitioning.

Horizontal center-side triple-tree partitioning: a block is horizontally split into three rectangular blocks so that the two side blocks share the same size while the size of the center block is the sum of the two side blocks. FIG. 5E is an example of horizontal center-side triple-tree partitioning.

For a block associated with a particular depth, video encoder 22 determines which partitioning type (including no further split) is used and signals the determined partition type explicitly or implicitly (e.g., the partition type may be derived from predetermined rules) to video decoder 30. Video encoder 22 may determine the partition type to use based on checking rate-distortion cost for the block using different partition types. To get the rate distortion cost, video encoder 22 may need to check possible partitioning types for the block, recursively.

Figure 6:
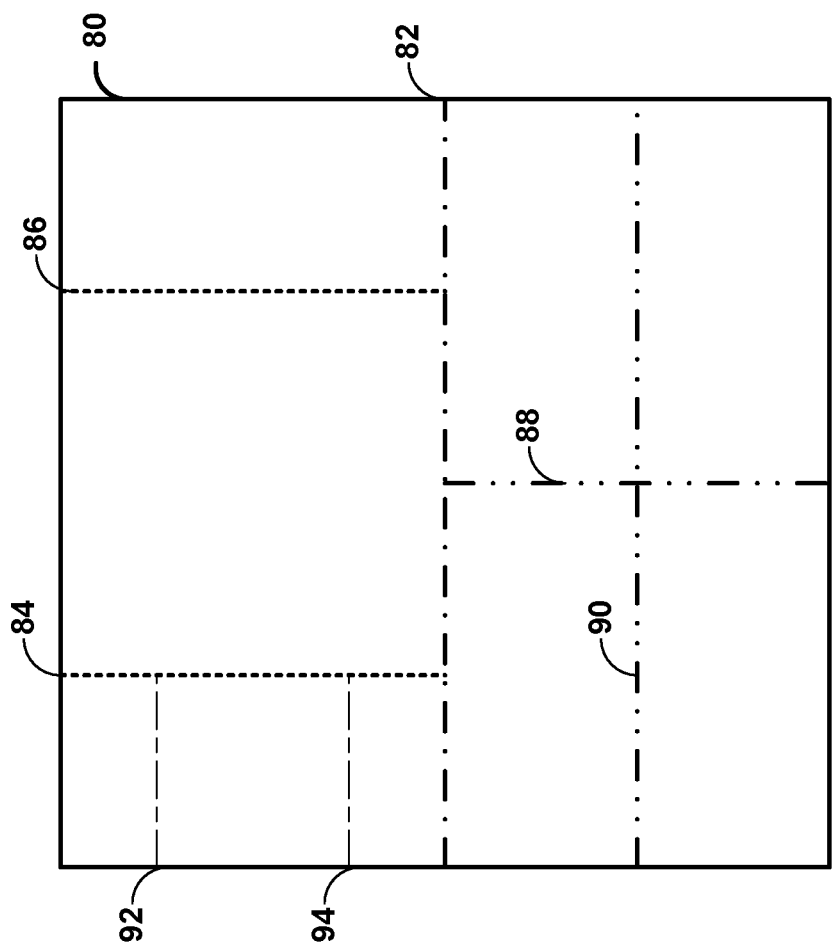
FIG. 6 is a conceptual diagram illustrating an example of coding tree unit (CTU) partitioning according to the techniques of this disclosure.

FIG. 6 is a conceptual diagram illustrating an example of coding tree unit (CTU) partitioning. In other words, FIG. 6 illustrates the partitioning of a CTB 80 corresponding to a CTU. In the example of FIG. 6, At depth 0, CTB 80 (i.e., the whole CTB) is split into two blocks with horizontal binary-tree partitioning (as indicated by line 82 with dashes separated by single dots).

At depth 1:
The upper block is split into three blocks with vertical center-side triple-tree partitioning (as indicated by lines 84 and 86 with small dashes).
The bottom block is split into four blocks with quad-tree partitioning (as indicated by lines 88 and 90 with dashes separated by two dots).

At depth 2:
The left side block of the upper block at depth 1 is split into three blocks with horizontal center-side triple-tree partitioning (as indicated by lines 92 and 94 with long dashes separated by short dashes).
No further split for the center and right blocks of the upper block at depth 1.
No further split for the four blocks of the bottom block at depth 1.

As can be seen in the example of FIG. 6, three different partition structures are used (BT, QT, and TT) with four different partition types (horizontal binary-tree partitioning, vertical center-side triple-tree partitioning, quad-tree partitioning, and horizontal center-side triple-tree partitioning).

In another example, additional constraints may be applied for block at a certain depth or with a certain size. For example, with the height/width of a block is smaller than 16 pixels, the block cannot be split with vertical/horizontal center-side tree to avoid a block with height/width smaller than 4 pixels.

Figure 7:
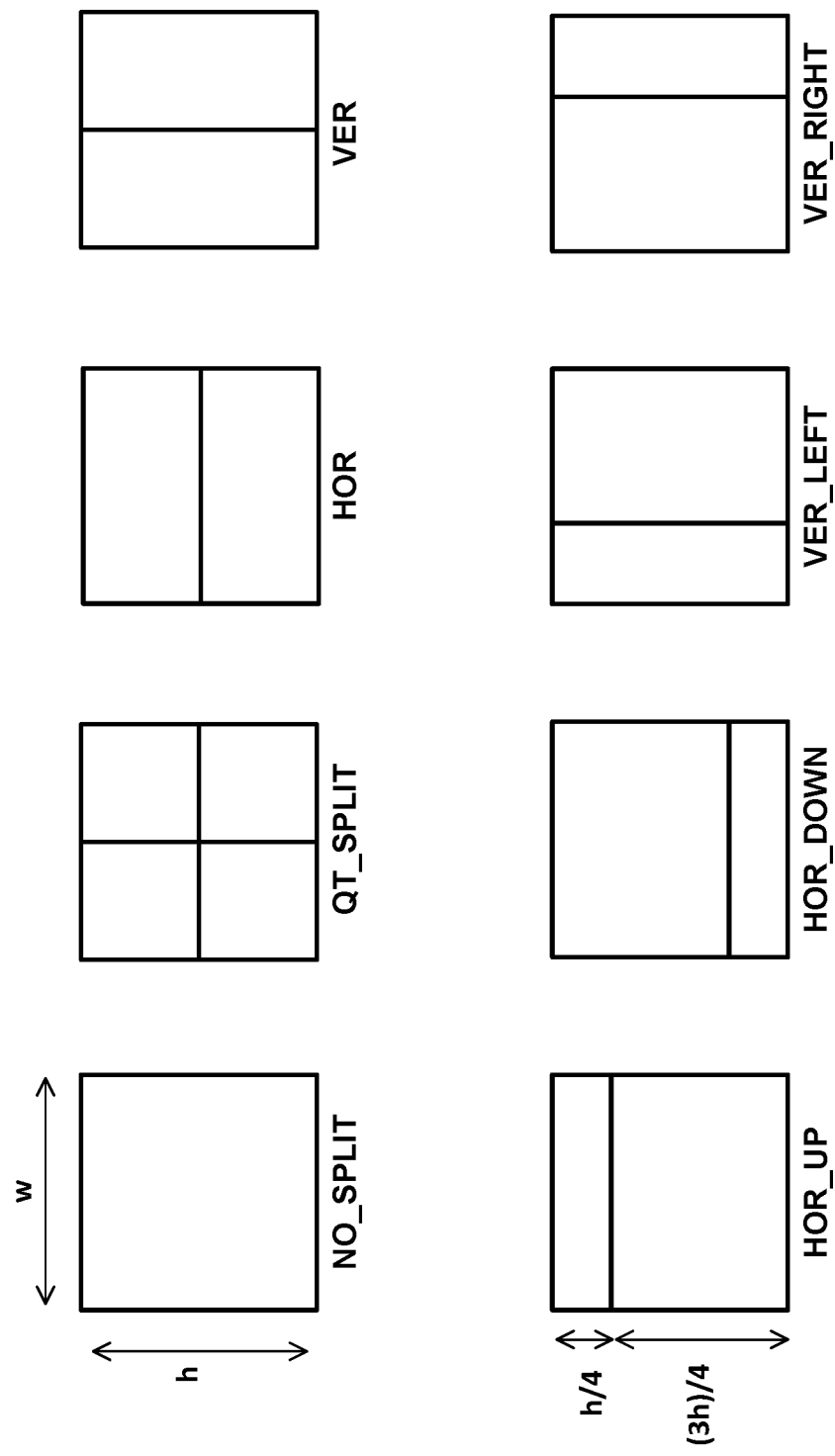
FIG. 7 is a conceptual diagram illustrating example asymmetric partitions according to one example of QTBT partitioning.

In F. Le Léannec, T. Poirier, F. Urban, "Asymmetric Coding Units in QTBT", JVET-D0064, Chengdu, October 2016 (hereinafter "NET-D0064"), asymmetric coding units were proposed to be used in conjunction with QTBT. Four new binary-tree splitting modes (e.g., partition types) were introduced into the QTBT framework, so as to allow new splitting configurations. So-called asymmetric splitting modes were proposed in addition to the splitting modes already available in QTBT, as shown by FIG. 7. As shown in FIG. 7, the HOR_UP, HOR_DOWN, VER_LEFT, and VER_RIGHT partition types are examples of asymmetric splitting modes.

According to the added asymmetric splitting modes, a coding unit with size S is divided into 2 sub-CU with sizes S/4 and 3. S/4, either in the horizontal (e.g., HOR_UP or HOR_DOWN) or in the vertical (e.g., VER_LEFT or VER_RIGHT) direction. In NET-D0064 the newly added CU width or height could only be 12 or 24.

Techniques for forward and inverse transform will now be discussed. In image/video coding, transforms are mainly applied to 2-D input data sources. Example methods of applying transform on 2-D input data include the separable and non-separable 2-D transforms. Separable 2-D transforms are normally used since separable transforms require fewer operation (additions and multiplications) counts as compared to non-separable 2-D transforms.

In one example, the variable X is an input W×H data array, where W is the width of the array and H is the height of the array. An example separable 2-D transform applies 1-D transforms for the horizontal and vertical vectors of X sequentially, formulated as below:

$$Y = C \cdot X \cdot R^T$$

where Y is the transformed array of X, and where C and R denote W×W and H×H transform matrices, respectively, which could be either in integer precision or double precision. T, (as in equation (1) below), represents the transform matrix in integer value. From the formulation, it can be seen that C applies 1-D vertical (column, left) transforms for the column vectors of X, while R applies 1-D horizontal (row, right) transforms for the row vectors of X.

In HEVC, W is equal to H (and is equal to S). As such, the W×H data array could be denoted by $2^{2*K}$, where K is an integer and S is equal to $2^K$. Transform matrixes (C and R) are generated as T as follows.

$$T = \text{int}(\sqrt{S} \cdot M \cdot 2^N), \quad (1)$$

where T represents the transform matrix in integer value, int( ) is the function to obtain the nearest integer value for each floating-point element value of a matrix, S denotes the size of transform (such as 8-point or 32-point transform), M indicates the unitary matrix for the transform type in float value, and $2^N$ is a scaling factor controlling the accuracy of the integer transform matrix T (such as N=6 being used in HEVC transforms). A complex square matrix U is unitary if its conjugate transpose U* is also it inverse (i.e., if U*U=U U*=I, where I is the identity matrix.) In addition, in HEVC, the transform matrix may be derived as T with a few elements being slightly adjusted by +1 or −1.

In HEVC, after horizontal and vertical transforms are applied, the output of the transform is enlarged by roughly $(\sqrt{S} \cdot 2^N)^2$ as compared to the unitary transform (i.e., M). Since S is a power of 2 in HEVC, the value of $(\sqrt{S} \cdot 2^N)^2$ also becomes a power of 2. Therefore, $\sqrt{S}$ introduced in transform matrix can be compensated with a bit shift during the transform. Since the HEVC matrices are scaled by $$\left(\sqrt{S} \cdot 2^N = 2^{N+\frac{K}{2}} = 2^{6+\frac{K}{2}}, \text{ suppose } S = 2^K\right)$$

compared to an orthonormal DCT transform, and in order to preserve the norm of the residual block through the forward and inverse two dimensional transforms, additional scale factors fwd_shift1 and fwd_shift2 are applied. Similarly, for the inverse transform, scaling factors are also used due to the inverse transform matrix scaled by $-\sqrt{S} \cdot 2^N$. Consequently, to preserve the norm through the two-dimensional forward and inverse transforms, the product of the scale factors shall be equal to $$\left(1/(2^{N+\frac{K}{2}})\right)^4 = 1/2^{24+2*K}).$$

For example, in a forward transform in HEVC reference software, video encoder 22 applies a shift after horizontal (fwd_shift1) and vertical (fwd_shift2) forward transforms as follows, respectively, to make sure after each transform, the output fits 16 bits if D is equal to 8.

$$\text{fwd\_shift1} = \log_2 S + D + 6 - r \qquad (2)$$

$$\text{fwd\_shift2} = \log_2 S + 6 \qquad (3)$$

For inverse transforms in HEVC reference software, video decoder 30 applies a shift after vertical (inv_shift1) and horizontal (inv_shift2) inverse transforms as follows, respectively, $$\text{inv\_shift1} = 7 \qquad (4)$$

$$\text{inv}_{shift2} = 5 - D + r \qquad (5)$$

where D represents the bit depth used for reconstructing the video. The sum of the four shifts is (2*log₂ S+24=2*K+24). The bit depth may be specified in the SPS. Bit depth values of D=8 and D=10 results in 8-bit and 10-bit pixel reconstructions, respectively. The parameter r is controls the precision of the horizontal forward transform. A larger value of r gives a higher precision. In some examples, the value of r may be the fixed value 15 or maximum of 15 or D+6 (e.g., max(15, D+6)) depending on the configuration as specified in the SPS.

Note that the same value of S is used in the shift1 and shift2 calculations above because only square transforms (sizes of horizontal and vertical transform are the same) are used in HEVC.

In some examples of video coding using QTBT partitioning, some new transforms, e.g., non-square 8×4 transforms. In this case, the output of log 2(W)+log 2(H) is not an even value. In this case, an additional factor √2 is introduced, but cannot be compensated with simple bit shift during transform. Therefore, it was proposed to absorb the value √2 into the quantization process (e.g., as opposed to changing the transform matrix), as described in U.S. Patent Publication No. 20170150176, filed Nov. 22, 2016, and U.S. Patent Publication No. 20170150183, filed Nov. 22, 2016.

In asymmetric coding units (e.g., those shown in FIG. 7), transforms with a size not being equal to a power of 2 may be used, such as transforms with the size 12 and 24. Accordingly, such asymmetric coding units introduce more factors which cannot be easily compensated in the transform process. Additional processing may be necessary to perform the transform or inverse transform on such asymmetric coding units.

Techniques for forward and/or inverse quantization will now be discussed. After the transform process, which compacts the residual energy to lower frequency coefficients, video encoder 22 applies quantization to control the distortion of residual reconstruction. At video decoder 30, accordingly, an inverse quantization (dequantization) process is performed prior to the inverse transform.

Figure 8:
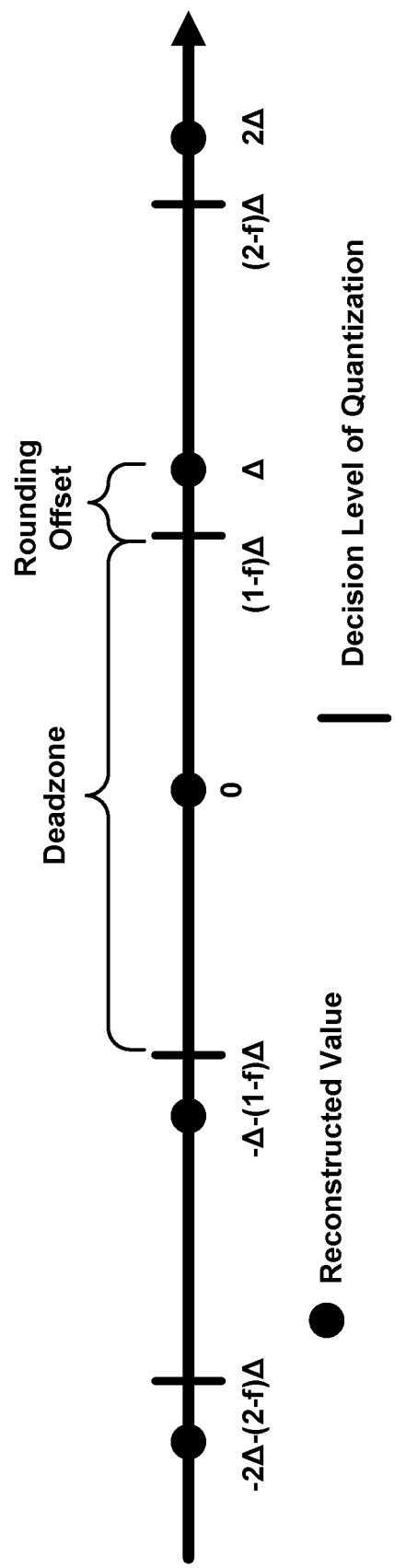
FIG. 8 is a conceptual diagram illustrating a deadzone plus uniform quantization scheme.

For forward quantization, in HEVC reference software, video encoder 22 applies a deadzone plus uniform quantization scheme, as described below, $$y' = \text{sign}(y) \cdot (|y| \cdot Q + f \cdot 2^{qbits}) \gg qbits \qquad (6)$$

where y is the input transform coefficient, Q is a quantization scaling factor, f is the rounding offset which controls the size of deadzone size (as shown in FIG. 8 wherein the deadzone is within the range [−(1−f)*Δ, (1−f)*Δ]), sign(y)=y>0? 1: −1, qbits is a shifting parameter, and y' gives the output quantized transform coefficient. All values falling into the deadzone region will be quantized to be 0. FIG. 8 is a conceptual diagram illustrating a deadzone plus uniform quantization scheme. In one example, the value of delta (Δ) in FIG. 8 may be $\Delta = 2^{qbits}$.

In HEVC, for an intra slice, f is 171/512, otherwise, f is 85/512.

The above quantization scaling factor Q and shifting parameter qbits are specified as below, $$Q = g\_quantScales[QP \%6] \qquad (7)$$

where QP is the user-defined quantization parameter, g_quantScales is a constant array as specified in HEVC reference software below.

```
const Int g_quantScales[SCALING_LIST_REM_NUM] =
{
    26214,23302,20560,18396,16384,14564
};
```

In addition, qbits is derived below, $$qbits = 14 + [QP/6] + i\text{TransformShift} \qquad (8)$$

where iTransformShift=r−D−log₍S₎, where S is the block size, D and r are the same as defined in equations (2) and (5) above.

For inverse quantization in HEVC, the inverse quantization process is specified as below, $$\hat{y} = \text{sign}(y') \cdot (|y'| \cdot DQ + 2^{qbits'-1}) \gg qbits' \qquad (9)$$

where y' is the input quantized transform coefficient, ŷ is the dequantized transform coefficient, DQ is specified as below, $$Q = g\_invQuantScales[QP \%6] \qquad (10)$$

where g_invQuantScales is a constant array specified as below,

```
const Int g_invQuantScales[SCALING_LIST_REM_NUM] =
{
    40,45,51,57,64,72
};
```

In addition, qbits' is derived below, $$qbits' = 6 - \lfloor QP/6 \rfloor - i\text{TransformShift} \qquad (11)$$

where iTransformShift=r−D−log₂(S), where S is the block size, D and r are same as defined in equations (2) and (5).

From the above definition of iTransformShift in equation (8), it can be seen that the inverse quantization process depends on the block size.

Separated tree structures for intra slices will now be discussed. In VCEG proposal COM16-C966, separated tree structures for intra slices was proposed. To further improve coding performance, especially for chroma components, it was proposed to have different tree structures for luma and chroma components in intra slices. That is, chroma blocks may be partitioned in a different manner than luma blocks. Intra slices are slices that include intra-coded coding units.

The following problems are observed with current proposals for coding video data according to various QTBT and MTT partitioning structures. When incorporating transforms whose sizes are not a power of 2 into an MTT framework, special processing may be needed to more efficiently process the factors which cannot be compensated with a shift operation during the transform and/or inverse transform process. When using separated luma and chroma tree structures under an MTT framework, a complicated tree structure for chroma components may not always be beneficial. When extending separated luma and chroma trees to inter frames, motion information is signaled for both luma and chroma which leads to significant signaling cost. When using separated luma and chroma tree structures, sometimes luma and chroma trees do have the same splitting patterns. In this case, it may not be efficient to signal luma and chroma partitions separately.

To address the problems mentioned above, the following techniques are proposed. Video encoder 22 and video decoder 30 may be configured to perform the following techniques in a reciprocal manner. The following itemized techniques may be applied individually. In addition, each of the following techniques may be used together in any combination.

In a first example of the disclosure, when incorporating transforms whose size is not a power of 2, this disclosure proposes to generate transform matrixes using a rounded modified S' instead of the true size S in equation (1) at video decoder 30 and/or at both video encoder 22 and video decoder 30. Transform that have a size that is not a power of 2 may occur when a block has a non-square shape. With such changes, the scaling of the transform, which cannot be compensated by bit shifting, is absorbed into the transform matrices. Thus, it may not be necessary to change other processing techniques in transform and quantization processing (assuming the $\sqrt{2}$ issue is handled in the manner discussed above).

In one aspect of the first example, video encoder 22 and video decoder 30 may be configured to round the true size S to the transform to obtain the modified value S' is by rounding the true size S to a value which is power of 2. For example, a value of S of 12 is rounded to 16, and a value of S of 24 is rounded to 32. In general, the value of S' may be obtained by rounding S up or down or to the closest power of 2.

In one example, video decoder 30 may be configured to receive an encoded block of video data. In one example, the encoded block of video data includes inverse quantized transform coefficients. In some examples, the block of video data may have a non-square shape. Video decoder 30 may be further configured to determine a transform for the encoded block of video data, wherein the transform has a size S that is not a power of two. Video decoder 30 may be further configured to round S to a power of two creating a transform with a modified size S'. Video decoder 30 may then apply an inverse transform with the modified size S' to the encoded block of video data to create residual video data, and decode the residual video data to create decoded block of video data.

Similarly, video encoder 22 may be configured to receive a block of video data. In some examples, video encoder 22 partitioned the block of video data into a non-square shape. Video encoder 22 may predict (e.g., using inter prediction and/or intra prediction) the block of video data to create residual video data. Video encoder 22 may determine a transform for the residual video data, wherein the transform has a size S that is not a power of two. Video encoder 22 may round S to a power of two creating a transform with a modified size S', and apply a transform with the modified size S' to the residual video data to create transform coefficients. In some examples, video encoder 22 may also quantize the transform coefficients. Video encoder 22 may then encode (e.g., using entropy coding such as CABAC), the transform coefficients in an encoded video bitstream.

In another aspect of the first example, the adaptive shift in equations (2) and (3) are based on S' instead of S. For example, modified equations (2)' and (3)' may be modified as follows:

$$\text{fwd\_shift1} = \log_2 S' + D + 6 - r \quad (2)'$$

$$\text{fwd\_shift2} = \log_2 + 6 \quad (3)'$$

In another aspect of the first example, when deriving the integer transform matrix T, the scaling factor ($\sqrt{S} \cdot 2^N$) on top of a unitary transform as shown in equation (1) is replaced by a pre-defined fixed value, e.g., 256, 512 or 1024. In one example, the right shift operation as described in equations (2) and (3) is modified in a way that the values of fwd_shift1 and/or fwd_shift2 no longer depend on S, i.e., $\log_2 S$ is removed from equations (2) and/or (3). In this case, S would be independent of the transform size, that is, the shift in equations (2) and (3) is set to a fixed value regardless of the transform size.

In another aspect of the first example, for the inverse transform, the original shift operation is kept unchanged. That is, video decoder 30 may be configured to perform an inverse shift as described in equations (4) and (5).

$$\text{inv\_shift1} = 7 \quad (4)$$

$$\text{inv}_{shift2} = 5 - D + r \quad (5)$$

In another aspect of the first example, the right shift operation as described in equations (8) and/or (11) is modified in a way that the values of qbits and/or qbits' no longer depends on S, i.e., $\log_2 S$ is removed from equations (8) and/or (11). Modified equations (8)' and (11)' are shown below.

In one example of the disclosure, when performing quantization of transform coefficients, video encoder 22 may determine the value of qbits as shown below, $$q\text{bits} = 14 + \lfloor QP/6 \rfloor + i\text{TransformShift} \quad (8)'$$

where iTransformShift=r−D, where D and r are the same as defined in equations (2) and (5) above.

In addition, when performing inverse quantization of transform coefficients, video decoder 30 may determine the value of qbits' as shown below, $$q\text{bits}' = 6 - \lfloor QP/6 \rfloor - i\text{TransformShift} \quad (11)'$$

where iTransformShift=r−D, where D and r are same as defined in equations (2) and (5).

In another aspect of the first example, the right shift operation as described in equations (4) and (5) is modified in a way that the values of inv_shift1 and/or inv_shift2 depends on S, such as $$\text{inv\_shift1} = 7 + \log_2 S \quad (4)''$$

$$\text{inv}_{shift2} = 5 - D + r + \log_2 S \quad (5)''$$

In a second example of the disclosure, when partitioning blocks according to an MTT structure, such as a structure that uses binary-tree, symmetric center-side triple-tree, quad-tree and asymmetric tree types, vide encoder 22 and video decoder 30 may be configured to partition blocks using a two-level MTT may be used. Example, two-level MTT structures are described in U.S. Patent Publication No. US 20170272782, filed Mar. 20, 2017. In two-level MTT, at a first level (referred to as "region-tree level"), a picture or block of video data is split into regions, each with one or multiple tree types which are able to partition a large block into small blocks quickly (e.g., using a quadtree or hexadecimal-tree). At the second level (referred to as a "prediction level"), a region is further split with MTT techniques (including no further split). The leaf node of a prediction tree is referred to in this disclosure as a coding unit (CU). In addition, the following techniques may be used.

In one aspect of the second example, for a prediction tree which has been signaled as further split, video encoder 22 may first signal a flag to indicate a vertical or horizontal split. Video encoder 22 may then signal a flag to indicate whether such a split is a symmetric split (e.g., binary-tree or symmetric center-side triple-tree). If the split is a symmetric split, video encoder 22 may signal the type index of the various allowed symmetric partition types, such as binary-tree or symmetric center-side triple-tree. Otherwise (e.g., the split is an asymmetric split), video encoder 22 may signal a flag to indicate whether the asymmetric split is an up or down split (e.g., when the split is a horizontal split), or to indicate the split is a left or right split (e.g., when the split is a vertical split). Video decoder 30 may be configured to receive and parse the aforementioned flags and partition video blocks accordingly.

In another aspect of the second example, for a prediction tree which has been signaled as being further split, video encoder 22 may first signal a flag to indicate a vertical or horizontal split. Next, video encoder 22 may signal a flag to indicate whether the split is a binary-tree partition type. If the split is not a binary-tree partition type, video encoder 22 may signal the type index of other tree types, such as symmetric center-side triple-tree or asymmetric tree. If the split is an asymmetric tree, video encoder 22 may signal a flag to indicate the split is an up or down split (e.g., when the split is a horizontal split), or to indicate the split is a left or right split (e.g., when the split is a vertical split). Video decoder 30 may be configured to receive and parse the aforementioned flags and partition video blocks accordingly.

In another aspect of the second example, for a prediction tree which has been signaled as further split, video encoder 22 may signal a flag to indicate a vertical or horizontal split may. Video encoder 22 may then signal a flag to indicate whether the split is symmetric center-side triple-tree. If the split is not a symmetric center-side triple-tree partition type, video encoder 22 may signal the type index of other tree types, such as binary-tree or asymmetric-tree. If the split is an asymmetric tree, video encoder 22 may signal a flag to indicate if the asymmetric tree split is an up or down split (e.g., when the split is a horizontal split), or to indicate the asymmetric tree split is a left or right split (e.g., when the split is a vertical split). Video decoder 30 may be configured to receive and parse the aforementioned flags and partition video blocks accordingly.

In another aspect of the disclosure, video encoder 22 may be configured to adaptively change the order for signaling syntax elements that indicate vertical/horizontal split, and/or up/down split, and/or left/right split, and/or tree type partition types according to characteristics of coded information, such as the associated indicators/partition types of neighboring blocks, or the slice/picture types. In one example, different slices/pictures may use different orders of signaled syntax elements to indicate the partitioning (e.g. how the blocks are split). In another example, video encoder 22 may be configured to change the order of syntax elements per block. Video decoder 30 may be configured to receive the aforementioned syntax elements in the same order determined by video encoder 22. Video decoder 30 may determine the order of the syntax elements in the same manner as video encoder 22.

Figure 9:
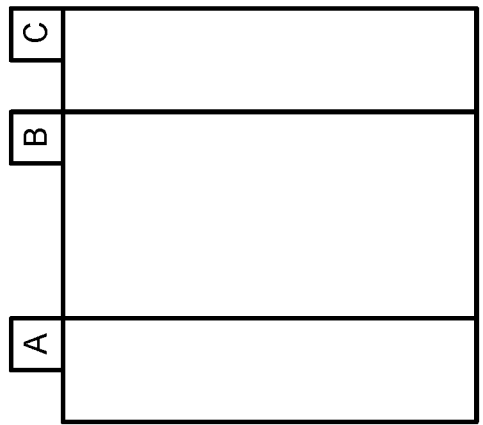
FIG. 9 shows example asymmetric partition types.
Figure 9:
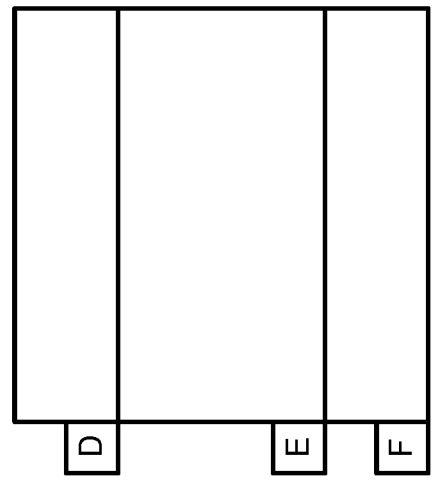
Figure 9:
Figure 9:
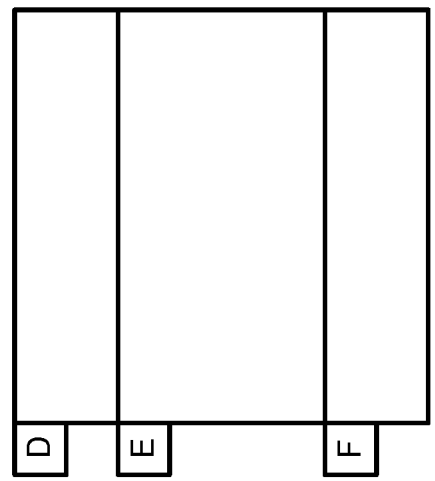
Figure 9:
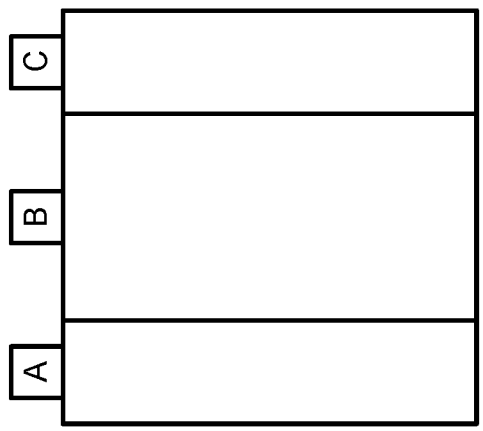
Figure 9:
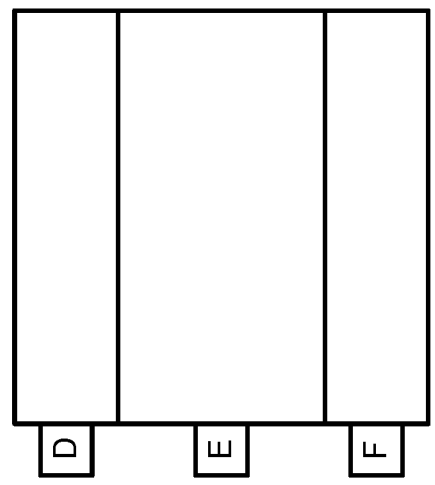

In another aspect of the second example, the context used to entropy code a syntax element indicating an asymmetric-tree partition type (e.g., top/down or left/right partitions) can be derived as follows. FIG. 9 shows example asymmetric partition types of this example of the disclosure. Let A, B, C be the block sizes of blocks covering locations immediately above central positions of each of the partitions illustrated in FIG. 9 (top left). In this example, video encoder 22 and video decoder 30 may determine the index of the context model using a counter, which is initialized to zero. The value of the counter is used to determine the context.

Consider the following conditions:
Condition 1: If A is not equal to B and B is equal to C.
Condition 2: If the above CU is a vertically-partitioned asymmetric tree with the boundary in the left half.

In one example, if either condition 1 or 2 is satisfied, video encoder 22 and video decoder 30 may be configured to increment the counter by one. In another example, if both conditions 1 and 2 are satisfied, video encoder 22 and video decoder 30 may be configured to increment the counter by one. In another example, video encoder 22 and video decoder 30 may be configured to increment the counter by one if condition 1 is satisfied. Similarly, video encoder 22 and video decoder 30 may be configured to increment the counter is by one if condition 2 is satisfied.

In another example, A, B, C may be at other positions relative to the partitions. In one example, A, B, C are the block sizes of blocks covering locations immediately above to the top-left corner of each of the partitions illustrated in FIG. 9 (middle of top). In another example, let A, B, C be the block sizes of blocks covering locations immediately above to the top-right corner of each of the partitions illustrated in FIG. 9 (top right).

In another example, let D, E, F be the block sizes of blocks covering locations immediately left to the central positions of each of the partitions illustrated in FIG. 9 (bottom left).

In this example, consider the following conditions:
Condition 1: If D is not equal to E and E is equal to F.
Condition 2: If the left CU is a horizontally partitioned asymmetric tree with the boundary in the top half.

In one example, if either condition 1 or 2 is satisfied, video encoder 22 and video decoder 30 may be configured to increment the counter by one. In another example, if both conditions 1 and 2 are satisfied, video encoder 22 and video decoder 30 may be configured to increment the counter by one. In another example, video encoder 22 and video decoder 30 may be configured to increment the counter by one if condition 1 is satisfied. Similarly, video encoder 22 and video decoder 30 may be configured to increment the counter by one if condition 2 is satisfied.

In another example, D, E, F may be at other positions. In one example, D, E, F are the block sizes of blocks covering locations immediately left to the top-left corner of each of the partitions illustrated in FIG. 9 (middle of bottom). In another example, let D, E, F be the block sizes of blocks covering locations immediately left to the bottom-left corner of each of the partitions illustrated in FIG. 9 (bottom right).

In another example, video encoder 22 and video decoder 30 may be configured to determine the locations of A-F in a pre-defined manner. In another example, video encoder 22 may be configured to signal the location of blocks A-F in the SPS, PPS, or the slice header.

In another aspect of the second example, video encoder 22 and video decoder 30 may be configured to derive the context of the flag used to signal the tree symmetricity as follows. In one example, a single context model can be used.

In another example, video encoder 22 and video decoder 30 may be configured to use a multi-level context model based on a counter. In one example, the initial value of the counter is zero. If the above CU is an asymmetric block, video encoder 22 and video decoder 30 may be configured to increment the counter by one. If the left CU is an asymmetric block, video encoder 22 and video decoder 30 may be configured to increment the counter by one. If the above-left CU is an asymmetric block, video encoder 22 and video decoder 30 may be configured to increment the counter by one. If the above-right CU is an asymmetric block, video encoder 22 and video decoder 30 may be configured to increment the counter by one. If none of the above four blocks belong to asymmetric block, video encoder 22 and video decoder 30 may be configured to set the counter to be 5.

In another aspect of the second example, video encoder 22 may be configured to conditionally generate and signal a flag to indicate whether a prediction tree is further split. When the size of prediction tree, without further splitting, uses a transform whose size is not supported, video encoder 22 may be configured to not signal the split flag. Rather, based on the condition that the size of prediction tree, without further splitting, uses a transform whose size is not supported, both video encoder 22 and video decoder 30 may be configured to infer that the prediction is to be further split.

In another aspect of the second example, in a video system coding with variable prediction tree (PT) depth based on the region tree (RT), the minimally allowable block sizes can be RT-dependent. As such, signaling the split flag of the PT, split direction flag (horizontal/vertical), tree symmetricity flag, or other aforementioned tree-type flags may be avoided. Also, similar constraint may be imposed on CTUs lying across frame boundaries if the CTU is allowed to be split with certain or all types of the PT.

In one example of the disclosure, video encoder 22 may be configured to partition video data using a two-level multi-type tree partitioning structure, and generate syntax elements indicating how a prediction tree of the two-level multi-type tree partition structure is structure, the syntax elements including one or more of a flag to indicate a vertical or horizontal split, a flag to indicate whether the split is a symmetric split, a type index, or a flag to indicate whether an asymmetric split is an up or down split or a left or right split. In one example, video encoder 22 may be configured to determine contexts for the syntax elements based on block sizes of neighboring blocks. In another example of the disclosure, video encoder 22 may be configured to determine contexts for the syntax elements based on partition types of neighboring blocks.

In a third example of the disclosure, when using a separated tree structure for luma and chroma components (e.g., luma blocks and chroma blocks are partitioned separately), video encoder 22 may be configured to generate and signal syntax elements that indicate the allowed tree types for luma and chroma components separately. That is, video encoder 22 may generate separate syntax elements indicating allowed tree types for both luma blocks and chroma blocks. The values of the syntax elements may indicate which of two or more tree types are allowed for a particular luma or chroma block. Example tree types may be any of the tree types discussed above, including symmetric and asymmetric binary tree types, quadtree tree types, and symmetric and asymmetric triple tree types. Video decoder 30 may be configured to parse the syntax elements indicting the allowed tree types.

Video encoder 22 may further be configured to signal additional syntax elements that indicate which of the allowed tree types to use for a specific block. Video decoder may be configured to parse the additional syntax elements and determine how to partition a particular block from the syntax elements that indicate the allowed tree types and the additional syntax elements indicating the specific tree type to use from among the allowed tree types.

In one example, video encoder 22 may signal the allowed tree types for luma and chroma components, separately, at a video parameter set (VPS), a sequence parameter set (SPS), a picture parameter set (PPS), an adaptation parameter set (APS), or any other sequence/picture/slice level syntax element body. In one example, the tree types may include at least two of binary tree, symmetric center-side triple tree, quadtree or asymmetric tree types. In another example, binary and/or symmetric center-side triple-tree may always be on (e.g., always allowed), while symmetric center-side triple-tree and/or asymmetric CU/tree partition types are optional and are signaled in the bitstream.

In a fourth example of the disclosure, when extending separated luma/chroma tree structure to inter slices, video encoder 22 may be configured to signal motion information once, such as only for the luma tree (also called a primary tree). Video decoder 30 may then be configured to inherit (e.g., reuse) the motion information for other tree structures (e.g., for secondary tree structures for chroma blocks) for blocks at a collocated position to the luma blocks. In the case that a collocated chroma block is larger than a single collocated luma block, video decoder 30 may be configured to reuse the motion information for all collocated luma blocks, i.e., one chroma coding block may include several sets of motion information from all collocated luma blocks. In another example, video decoder 30 may be configured to use the motion information of the primary tree as a predictor for the motion information of other trees (e.g., the tree structure for chroma blocks).

In general, according to this example of the disclosure, video decoder 30 may be configured to partition a luma block of video data, and partition one or more chroma blocks of video data separately from partitioning the luma block of video data. The partition structure for the luma block of video data may be a multi-type tree partition structure, and the partition structure for the one or more chroma blocks of video data may also be the multi-type tree partition structure. Video decoder 30 may be further configured to for an inter slice, determine motion information the luma block of video data, and infer motion information for the one or more chroma blocks of video data from the determined motion information for the luma block of video data.

In a fifth example of the disclosure, in separated tree coding (e.g., luma and chroma blocks are partitioned separately, with potentially different partitioning), the tree split pattern of a chroma tree (may be called a secondary tree) is inherited from the luma tree (may be called a primary tree) when the collocated block in the primary tree contains both intra and inter coded blocks. That is, video encoder 22 and video decoder 30 may be configured to partition chroma blocks using the same split pattern as associated luma blocks, when the luma blocks include both intra and inter coded blocks.

In this example, video encoder 22 may be configured to only signal a tree split pattern for the secondary tree only when the collocated block in primary tree (e.g., the luma block) only contains same-type blocks. That is, the collocated luma blocks includes either all inter coded blocks or all intra coded blocks. In one example, the tree split pattern includes, but is not limited to, a tree type (non-split may also be regarded as a special tree type). Tree types may include both symmetric and asymmetric tree types, such as binary tree, triple tree, and quadtree.

In general, according to this example of the disclosure, video decoder 30 may be configured to partition a luma block of video data, infer the partitioning for one or more chroma blocks of video data to be the same as for the luma block of video data in the case that the luma block includes both intra coded blocks and inter coded blocks, and determine, from signaled syntax elements, the partitioning for the one or more chroma blocks of video data when the luma blocks include all of the same type of coded blocks.

In a sixth example of the disclosure, in order to reduce the signaling cost of a PT split flag, video encoder 22 and video decoder 30 may be configured to determine the contexts of the PT split flag using the relative sizes of the neighboring blocks to that of the current block.

In one example, video encoder 22 and video decoder 30 may be configured to select the context for PT tree-type coding using the size of the blocks relative to its neighbor blocks. In one example, when the width of the current block is greater than the width of its above neighbor, it is more likely for the current block to be further split. Similarly, when the height of the current block is greater than the height of its left neighbor, it is more likely for the current block to be further split. Furthermore, the relative size of the top-left, top-right, and the bottom-left neighbors to the current block size also provides useful information to determine whether the current block should be further split. If the current block size is greater than its neighbors' block sizes, it is also more likely for the current block to be further split. Video encoder 22 and video decoder 30 may be configured to use an aggregated number of occurrences of the aforementioned events as an index to the context for the PT split flag. Also, individual event can also form a set of contexts for the PT split flag.

In one example, video encoder 22 and video decoder 30 may be configured to use the width of the top neighbor block and the height of the left neighbor block to determine a context for PT split direction (e.g., horizontal split or vertical split). If the width of the top neighbor block is smaller than that of the current block and the height of the left neighbor block is greater or equal to that of the current block, it is more likely for the current block to be split vertically. Similarly, if the height of the left neighbor block is smaller than that of the current block and the width of the top neighbor block is greater or equal to that of the current block, it is more likely for the current block to be split horizontally.

In another example, video encoder 22 and video decoder 30 may be configured to use the width of the top neighbor block and the height of the left neighbor block to determine a context for a PT split mode (e.g., a determination between split modes, such as between binary tree and center-side triple tree). If the width of the top neighbor block is smaller than that of the current block and the current block is vertically split, or if the height of the left neighbor block is smaller than that of the current block and the current block is horizontally split, it is more likely for the current block to be split as triple tree.

In one example, if the neighboring blocks are not available, video encoder 22 and video decoder 30 may be configured to use a default context value during the derivation of the current context. In another example, when different RT or PT splittings are allowed for different components (such as Y, Cb, Cr or depth components), all the aforementioned methods can be applied by using the associated blocks in the other components as the neighbor blocks.

In another example, video encoder 22 and video decoder 30 may be configured to use the relative depth of the neighboring blocks to that of the current block to determine the context of the PT split syntax element.

In another example, for one side of a block with width/height equal to three times of minimum block size, video encoder 22 and video decoder 30 may be configured to use the block size or PT depth of the central location of top or left neighbor bocks to derive the contexts.

In another example, when the width/height of a block is equal to three times of the minimum block size, video encoder 22 and video decoder 30 may be configured to use the averaged value of the block sizes or PT depth of the three neighboring blocks to derive the contexts.

In another example, when the width/height of a block is equal to three times of the minimum block size, video encoder 22 and video decoder 30 may be configured to use the maximum value of the block sizes or PT depth of the three neighboring blocks to derive the contexts.

In another example, when the width/height of a block is equal to three times of the minimum block size, video encoder 22 and video decoder 30 may be configured to use the minimum value of the block sizes or PT depth of the three neighboring blocks to derive the contexts.

In another example, when the width/height of a block is equal to three times of the minimum block size, video encoder 22 and video decoder 30 may be configured to use the median value of the block sizes or PT depth of the three neighboring blocks can to derive the contexts.

In another example, the aggregated value of the block sizes or PT depth (as described above) is a representation of the size of the neighboring block. In one example, if the width of the top neighbor is smaller than the width of the current block, context 1 is used. Otherwise, context 0 is used. Similarly, if the height of the left neighbor is smaller than the height of the current block, context 1 is used. Otherwise, context 0 is used. In one example, the aggregated value of the block sizes or PT depth can be used to increment a counter which is equal to or controls the index of the context model to use. Also, the aggregated value can be linked to the design in the equation below as a replacement of singly-positioned values. For each of the neighboring block, the following setting process of a context (CTX) may be performed in order. The sum of CTX may be utilized for selecting the context index. In another example, the first two equations below are firstly applied to each of the neighboring blocks, and then the last equation is utilized to select the context index wherein the input CTX is the sum of CTX from all neighboring blocks.

$$CTX=(W>W_{T2})+(H>H_{L2})+(W*H>STL)+(W*H>STR)$$

$$CTX=((W<W_{T2})\&\&(H<H_{L2})\&\&(W*H<STL)\&S(W*H<STR))?0: CTX$$

$$CTX=(CTX\geq 3)?3: CTX$$

In general, according to this example of the disclosure, video encoder 22 and video decoder 30 may be configured to determine a context for a split flag of a current block based on relative sizes of neighboring blocks to the current block, and context coding the split flag based on the determined context.

In a seventh example of the disclosure, in any tree structure framework, such as MTT, video encoder 22 and/or video decoder 30 may be configured to apply transforms based on block size. In some examples, certain block sizes may not have related transforms (i.e., no same-size transform supported). For example, video encoder 22 and/or video decoder 30 may be configured to partition a 64×48 CU, but may not be configured to use a 48×48 transform. In another example, video encoder 22 and/or video decoder 30 may be configured to partition a 256×256 CU, but the largest supported transform is only 128×128.

In these examples, video encoder 22 and/or video decoder 30 may be configured to only allow certain coding modes for such CUs. In one example, video encoder 22 and/or video decoder 30 may only be configured to use skip mode for a CU if there is no related transform for the CU. In this example, a related transform is a transform having a size equal to at least one dimension of the CU. In this example, video encoder 22 may not signal a skip mode flag. Rather, video decoder 30 may be configured to infer that the value of the skip flag is true based on the CU being of a size with no related transforms.

In another example, video encoder 22 and/or video decoder 30 may be configured to disallow a CU to have any non-zero residues (residual values) if there is no supported transform for the size of the CU. In this example, video encoder may not be configured to signal a coded block flag (CBF). A coded block flag is a flag that indicates whether or not a block includes any non-zero transform coefficients. Since, in this example, a CU may not have any non-zero residual values if the CU does not have a supported transform, video decoder 30 may indicate that the CBF flag is zero (i.e., there are no non-zero transform coefficients).

In one example, video encoder 22 and video decoder 30 may be configured to determine a coding mode for a block of video data based on the size of the block of video data. In particular, video encoder 22 and video decoder 30 may be configured to determine a coding mode for the block of video data based on the size of the block of the video data and transforms that are supported by video encoder 22 and video decoder 30. If there is no supported transform related to the size of the block of video data, video encoder 22 and video decoder 30 may be configured to determine certain predetermined coding modes for the block of video data. In one example, the coding mode may be the skip mode. In another example of the disclosure, the coding mode may be another coding mode (e.g., merge mode, AMVP mode, intra mode), but the CBF flag is inferred to be zero.

In general, video encoder 22 and video decoder 30 may be configured to determine if a block has an associated transform based on the size of the block, and restart a coding mode for the block if the block does not have an associated transform.

Figure 10:
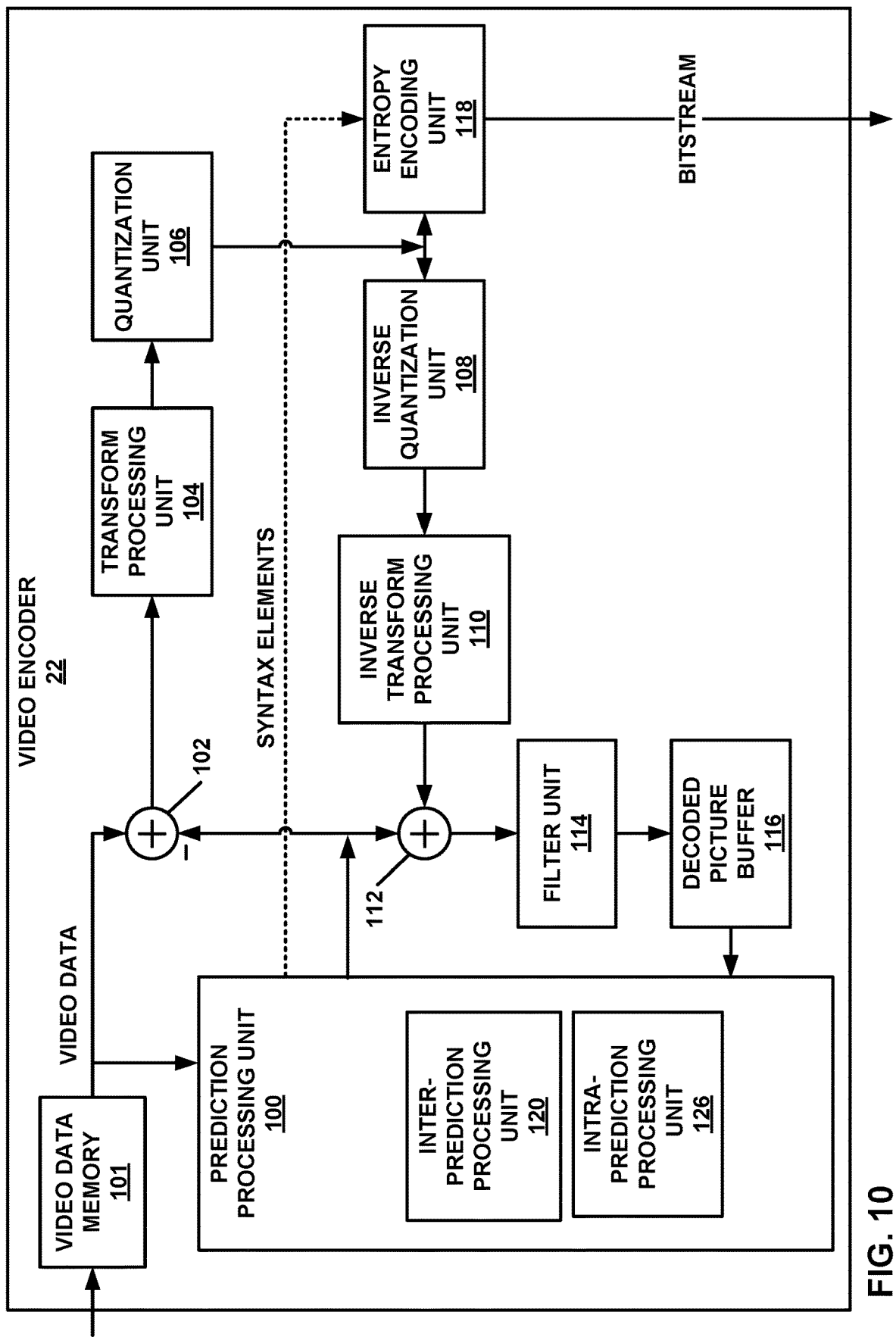
FIG. 10 is a block diagram illustrating an example of a video encoder.

FIG. 10 is a block diagram illustrating an example video encoder 22 that may implement the techniques of this disclosure. FIG. 10 is provided for purposes of explanation and should not be considered limiting of the techniques as broadly exemplified and described in this disclosure. The techniques of this disclosure may be applicable to various coding standards or methods.

In the example of FIG. 10, video encoder 22 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 22. The video data stored in video data memory 101 may be obtained, for example, from video source 18. Decoded picture buffer 116 may be a reference picture memory that stores reference video data for use in encoding video data by video encoder 22, e.g., in intra- or inter-coding modes. Video data memory 101 and decoded picture buffer 116 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 22, or off-chip relative to those components. Video data memory 101 may be the same as or part of storage media 20 of FIG. 1.

Video encoder 22 receives video data. Video encoder 22 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns. In one example, prediction processing unit 100 or another processing unit of video encoder 22 may be configured to perform any combination of the MTT partitioning techniques described above.

Video encoder 22 may encode CUs of a CTU to generate encoded representations of the CUs (i.e., coded CUs). As part of encoding a CU, prediction processing unit 100 may partition the coding blocks associated with the CU among one or more PUs of the CU. In accordance with techniques of this disclosure, a CU may only include a single PU. That is, in some examples of this disclosure, a CU is not divided into separate prediction blocks, but rather, a prediction process is performed on the entire CU. Thus, each CU may be associated with a luma prediction block and corresponding chroma prediction blocks. Video encoder 22 and video decoder 30 may support CUs having various sizes. As indicated above, the size of a CU may refer to the size of the luma coding block of the CU also the size of a luma prediction block. As discussed above, video encoder 22 and video decoder 30 may support CU sizes defined by any combination of the example MTT partitioning types described above.

Inter-prediction processing unit 120 may generate predictive data for a PU by performing inter prediction on each PU of a CU. As explained above, in some MTT examples of this disclosure a CU may contain only a single PU, that is, the CU and PU may be synonymous. The predictive data for the PU may include predictive blocks of the PU and motion information for the PU. Inter-prediction processing unit 120 may perform different operations for a PU or a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT. In other examples, transform processing unit 104 may be configured to partition TUs in accordance with the MTT techniques described above. For example, video encoder 22 may not further divide CUs into TUs using an RQT structure. As such, in one example, a CU includes a single TU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 22 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 22 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 22. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 22 may output a bitstream that includes entropy-encoded data generated by entropy encoding unit 118. For instance, the bitstream may include data that represents the partition structure for a CU according to the techniques of this disclosure.

Figure 11:
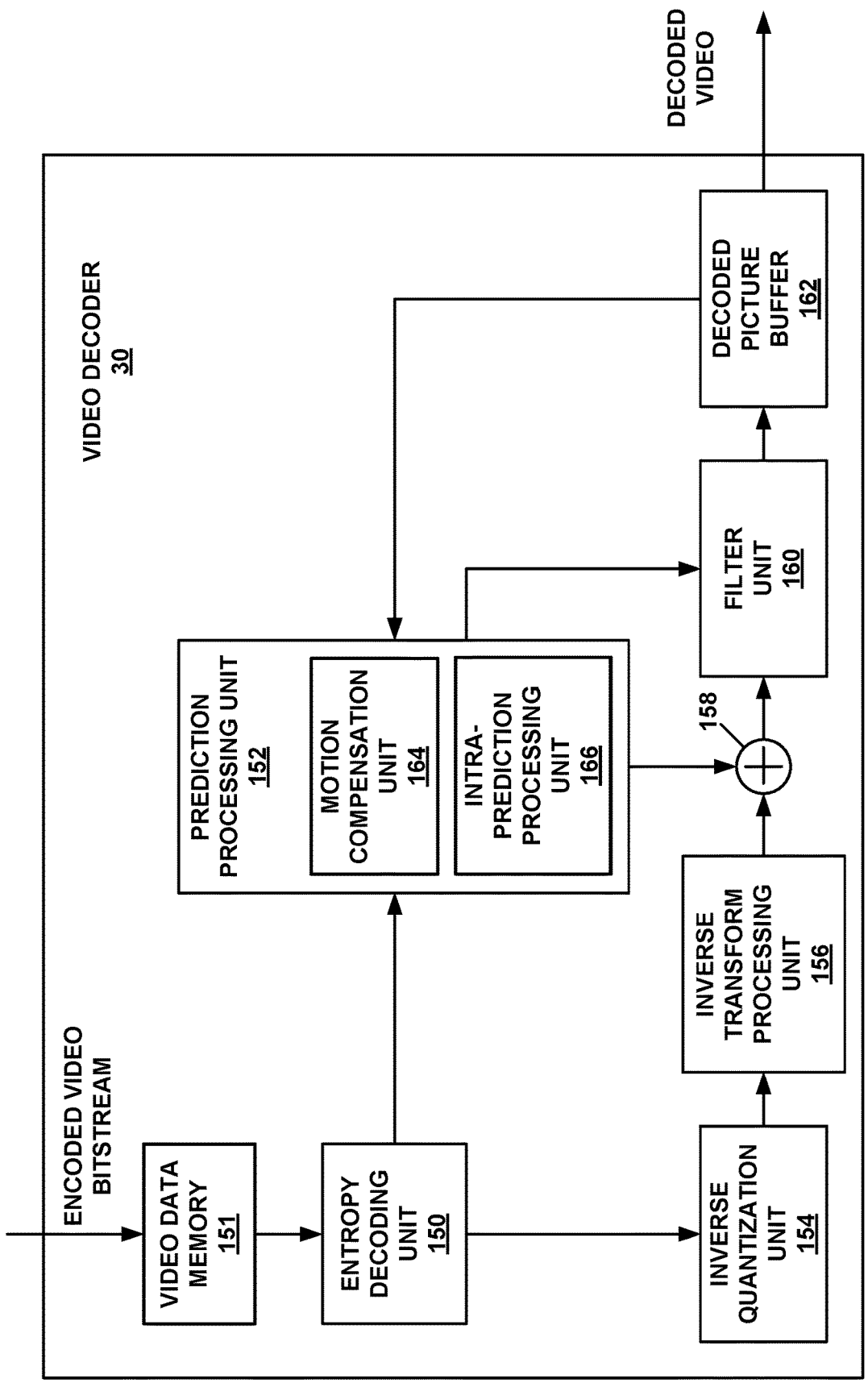
FIG. 11 is a block diagram illustrating an example of a video decoder.

FIG. 11 is a block diagram illustrating an example video decoder 30 that is configured to implement the techniques of this disclosure. FIG. 11 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 11, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In accordance with some examples of this disclosure, entropy decoding unit 150, or another processing unit of video decoder 30, may determine a tree structure as part of obtaining the syntax elements from the bitstream. The tree structure may specify how an initial video block, such as a CTB, is partitioned into smaller video blocks, such as coding units. In accordance with one or more techniques of this disclosure, for each respective non-leaf node of the tree structure at each depth level of the tree structure, there are a plurality of allowed partition types for the respective non-leaf node and the video block corresponding to the respective non-leaf node is partitioned into video blocks corresponding to the child nodes of the respective non-leaf node according to one of the plurality of allowable splitting patterns.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU. As discussed above, in one example of the disclosure, a CU includes a single TU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a CU or PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU. As discussed above, in one example of the disclosure using MTT partitioning, a CU may include only a single PU. That is, a CU may not be divided into multiple PUs.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 12:
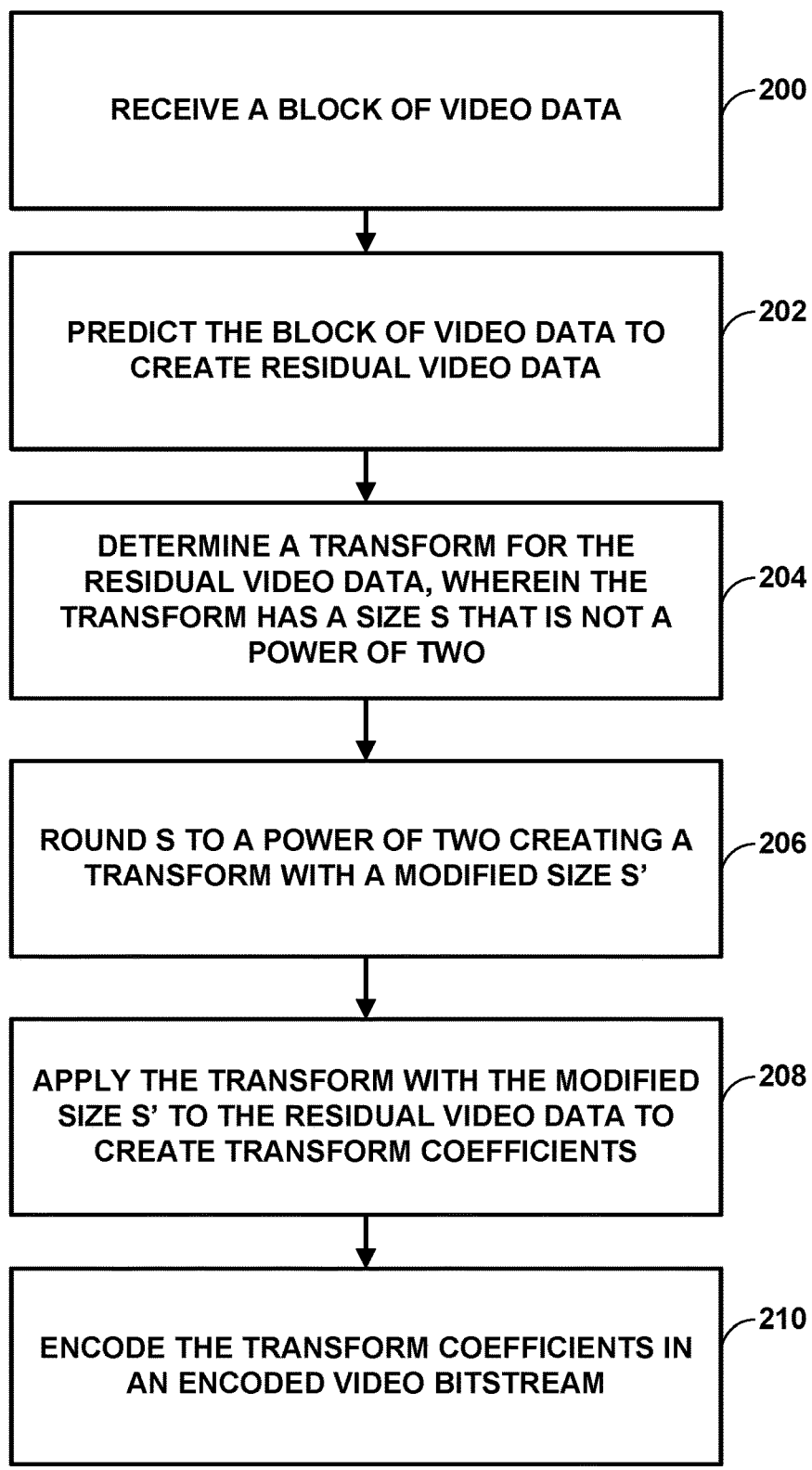
FIG. 12 is a flowchart showing an example encoding method of the disclosure.

FIG. 12 is a flowchart showing an example encoding method of the disclosure. The techniques of FIG. 12 may be performed by video encoder 22, including transform processing unit 104 and/or quantization unit 106.

In one example of the disclosure, video encoder 22 may be configured to receive a block of the video data (200), and predict the block of the video data to create residual video data (202). Video encoder 22 may be further configured to determine a transform for the residual video data, wherein the transform has a size S that is not a power of two (204), and round S to a power of two creating a transform with a modified size S' (206). Video encoder 22 may also apply the transform with the modified size S' to the residual video data to create transform coefficients (208), and encode the transform coefficients in an encoded video bitstream (210).

In another example, video encoder 22 may be configured to round S to a nearest power of two.

In another example, video encoder 22 may be configured to quantize the transform coefficients.

In another example, the block of video data has a non-square shape.

In another example, S is 12, and video encoder 22 may be configured to round 12 to 16, wherein the modified size S' is 16. In another example, S is 24, and video encoder 22 may be configured to round 24 to 32, wherein the modified size S' is 32.

In one example, S is the width of the transform. In another example, S is the height of the transform.

Figure 13:
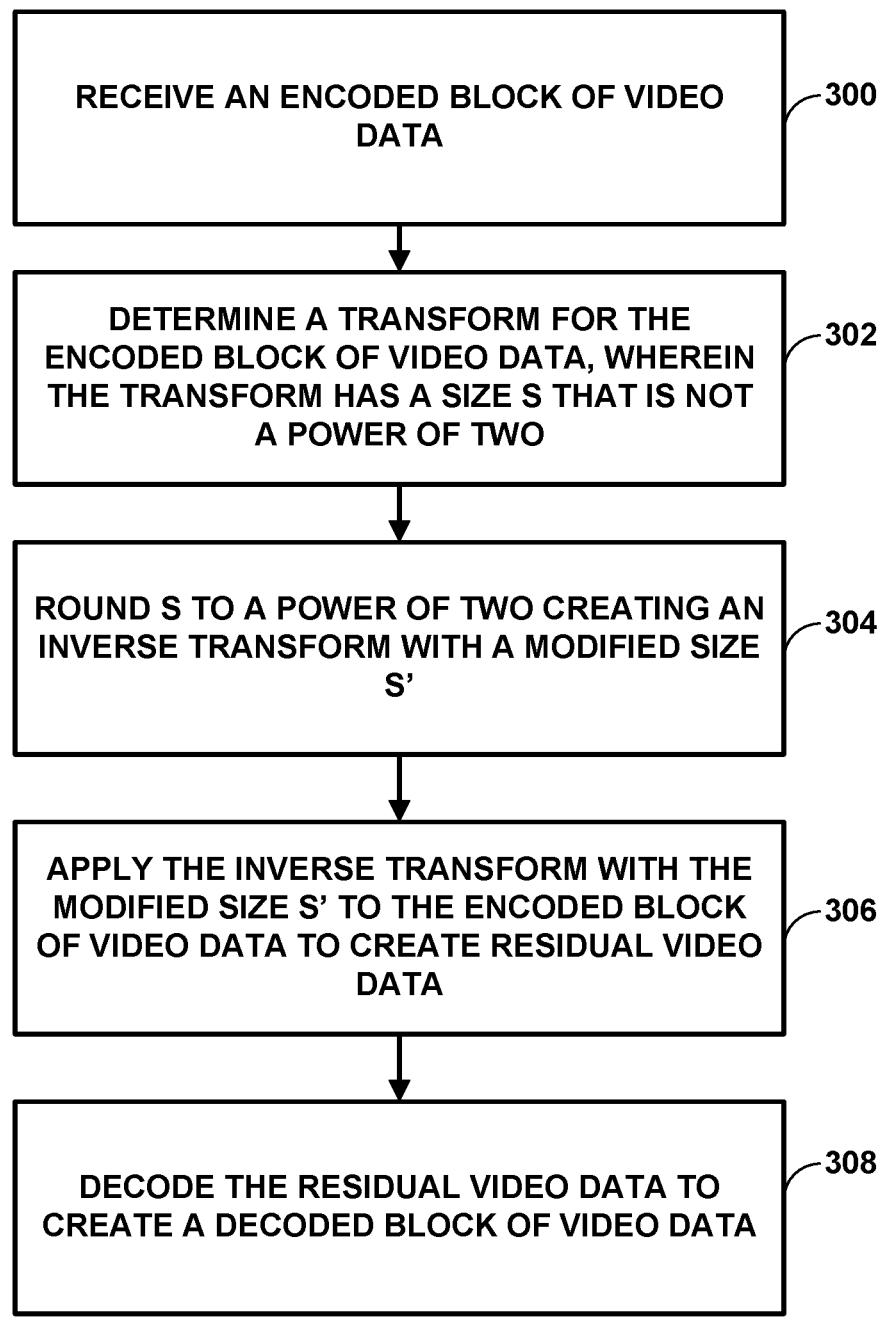
FIG. 13 is a flowchart showing an example decoding method of the disclosure.

FIG. 13 is a flowchart showing an example decoding method of the disclosure. The techniques of FIG. 13 may be performed by video decoder 30, including inverse transform processing unit 156 and/or inverse quantization unit 154.

In one example of the disclosure, video decoder 30 may be configured to receive an encoded block of the video data (300), determine a transform for the encoded block of the video data, wherein the transform has a size S that is not a power of two (302), and round S to a power of two creating an inverse transform with a modified size S' (304). Video decoder 30 may be further configured to apply the inverse transform with the modified size S' to the encoded block of the video data to create residual video data (306), and decode the residual video data to create a decoded block of the video data (308).

In one example, video decoder 30 may be configured to round S to a nearest power of two. In another example, S is 12 and video decoder 30 may be configured to round 12 to 16, wherein the modified size S' is 16. In another example, S is 24 and video decoder 30 may be configured to round 24 to 32, wherein the modified size S' is 32.

In another example, the encoded block of the video data includes inverse quantized transform coefficients. In another example, the encoded block of the video data has a non-square shape. In one example, S is the width of the transform. In another example, S is the height of the transform.

In another example of the disclosure, video decoder 30 may be configured to determine shift values for the inverse transform based on S'.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    receiving an encoded block of video data, wherein the block of video data is partitioned into a triple-tree partition structure, and wherein the triple-tree partition structure divides the block into three sub-blocks without dividing the block through a center of the block;
    determining a transform for the encoded block of video data, wherein transform matrices of the transform have a size S that is not a power of two;
    rounding S to a power of two creating an inverse transform with transform matrices having a modified size S';
    applying the inverse transform with the transform matrices having the modified size S' to the encoded block of video data to create residual video data; and
    decoding the residual video data to create a decoded block of video data.

2. The method of claim 1, wherein rounding S to a power of two comprises rounding S to a nearest power of two.

3. The method of claim 1, wherein the encoded block of video data includes inverse quantized transform coefficients.

4. The method of claim 1, wherein the encoded block of video data has a non-square shape.

5. The method of claim 1, wherein S is 12, and wherein rounding S to a power of two comprises rounding 12 to 16, wherein the modified size S' is 16.

6. The method of claim 1, wherein S is 24, and wherein rounding S to a power of two comprises rounding 24 to 32, wherein the modified size S' is 32.

7. The method of claim 1, wherein S is a width of the transform.

8. The method of claim 1, wherein S is a height of the transform.

9. A method of encoding video data, the method comprising:
    receiving a block of video data, wherein the block of video data is partitioned into a triple-tree partition structure, and wherein the triple-tree partition structure divides the block into three sub-blocks without dividing the block through a center of the block;
    predicting the block of video data to create residual video data;
    determining a transform for the residual video data, transform matrices of the transform have a size S that is not a power of two;
    rounding S to a power of two creating a transform with transform matrices having a modified size S';
    applying the transform with the transform matrices having the modified size S' to the residual video data to create transform coefficients; and
    encoding the transform coefficients in an encoded video bitstream.

10. The method of claim 9, wherein rounding S to a power of two comprises rounding S to a nearest power of two.

11. The method of claim 9, further comprising:
    quantizing the transform coefficients.

12. The method of claim 9, wherein the block of video data has a non-square shape.

13. The method of claim 9, wherein S is 12, and wherein rounding S to a power of two comprises rounding 12 to 16, wherein the modified size S' is 16.

14. The method of claim 9, wherein S is 24, and wherein rounding S to a power of two comprises rounding 24 to 32, wherein the modified size S' is 32.

15. The method of claim 9, wherein S is a width of the transform.

16. The method of claim 9, wherein S is a height of the transform.

17. An apparatus configured to decode video data, the apparatus comprising:
    a memory configured to store the video data; and
    one or more processors in communication with the memory, the one or more processors configured to:
        receive an encoded block of the video data, wherein the block of video data is partitioned into a triple-tree partition structure, and wherein the triple-tree partition structure divides the block into three sub-blocks without dividing the block through a center of the block;
        determine a transform for the encoded block of video data, wherein transform matrices of the transform have a size S that is not a power of two;
        round S to a power of two creating an inverse transform with transform matrices having a modified size S';
        apply the inverse transform with the transform matrices having the modified size S' to the encoded block of video data to create residual video data; and
        decode the residual video data to create a decoded block of the video data.

18. The apparatus of claim 17, wherein to round S to a power of two, the one or more processors are configured to round S to a nearest power of two.

19. The apparatus of claim 17, wherein the encoded block of the video data includes inverse quantized transform coefficients.

20. The apparatus of claim 17, wherein the encoded block of the video data has a non-square shape.

21. The apparatus of claim 17, wherein S is 12, and wherein to round S to a power of two, the one or more processors are configured to round 12 to 16, wherein the modified size S' is 16.

22. The apparatus of claim 17, wherein S is 24, and wherein to round S to a power of two, the one or more processors are configured to round 24 to 32, wherein the modified size S' is 32.

23. The apparatus of claim 17, wherein S is a width of the transform.

24. The apparatus of claim 17, wherein S is a height of the transform.

25. The apparatus of claim 17, further comprising:
a display configured to display the decoded block of the video data.

26. An apparatus configured to encode video data, the apparatus comprising:
a memory configured to store the video data; and
one or more processors in communication with the memory, the one or more processors configured to:
receive a block of the video data, wherein the block of video data is partitioned into a triple-tree partition structure, and wherein the triple-tree partition structure divides the block into three sub-blocks without dividing the block through a center of the block;
predict the block of the video data to create residual video data;
determine a transform for the residual video data, transform matrices of the transform have a size S that is not a power of two;
round S to a power of two creating a transform with transform matrices having a modified size S';
apply the transform with the transform matrices having the modified size S' to the residual video data to create transform coefficients; and
encode the transform coefficients in an encoded video bitstream.

27. The apparatus of claim 26, wherein to round S to a power of two, the one or more processors are configured to round S to a nearest power of two.

28. The apparatus of claim 26, wherein the one or more processors are further configured to:
quantize the transform coefficients.

29. The apparatus of claim 26, wherein the block of video data has a non-square shape.

30. The apparatus of claim 26, wherein S is 12, and wherein to round S to a power of two, the one or more processors are configured to round 12 to 16, wherein the modified size S' is 16.

31. The apparatus of claim 26, wherein S is 24, and wherein to round S to a power of two, the one or more processors are configured to round 24 to 32, wherein the modified size S' is 32.

32. The apparatus of claim 26, wherein S is a width of the transform.

33. The apparatus of claim 26, wherein S is a height of the transform.

34. The apparatus of claim 26, further comprising:
a camera configured to capture the video data.

35. An apparatus configured to decode video data, the apparatus comprising:
means for receiving an encoded block of video data, wherein the block of video data is partitioned into a triple-tree partition structure, and wherein the triple-tree partition structure divides the block into three sub-blocks without dividing the block through a center of the block;
means for determining a transform for the encoded block of video data, wherein transform matrices of the transform have a size S that is not a power of two;
means for rounding S to a power of two creating an inverse transform with transform matrices having a modified size S';
means for applying the inverse transform with the transform matrices having the modified size S' to the encoded block of video data to create residual video data; and
means for decoding the residual video data to create a decoded block of video data.

36. An apparatus configured to encode video data, the apparatus comprising:
means for receiving a block of video data, wherein the block of video data is partitioned into a triple-tree partition structure, and wherein the triple-tree partition structure divides the block into three sub-blocks without dividing the block through a center of the block;
means for predicting the block of video data to create residual video data;
means for determining a transform for the residual video data, transform matrices of the transform have a size S that is not a power of two;
means for rounding S to a power of two creating a transform with transform matrices having a modified size S';
means for applying the transform with the transform matrices having the modified size S' to the residual video data to create transform coefficients; and
means for encoding the transform coefficients in an encoded video bitstream.

37. A non-transitory computer-readable storage medium storing instructions that, when executed, causes one or more processors of a device configured to decode video data to:
receive an encoded block of the video data, wherein the block of video data is partitioned into a triple-tree partition structure, and wherein the triple-tree partition structure divides the block into three sub-blocks without dividing the block through a center of the block;
determine a transform for the encoded block of video data, wherein transform matrices of the transform have a size S that is not a power of two;
round S to a power of two creating an inverse transform with transform matrices having a modified size S';
apply the inverse transform with the transform matrices having the modified size S' to the encoded block of video data to create residual video data; and
decode the residual video data to create a decoded block of the video data.

38. A non-transitory computer-readable storage medium storing instructions that, when executed, causes one or more processors of a device configured to encode video data to:
receive a block of the video data, wherein the block of video data is partitioned into a triple-tree partition structure, and wherein the triple-tree partition structure divides the block into three sub-blocks without dividing the block through a center of the block;
predict the block of the video data to create residual video data;
determine a transform for the residual video data, transform matrices of the transform have a size S that is not a power of two;
round S to a power of two creating a transform with transform matrices having a modified size S';
apply the transform with the transform matrices having the modified size S' to the residual video data to create transform coefficients; and encode the transform coefficients in an encoded video bitstream.

\* \* \* \* \*